(12) United States Patent
Tokumoto et al.

(10) Patent No.: US 7,568,400 B2
(45) Date of Patent: *Aug. 4, 2009

(54) TORQUE DETECTING APPARATUS

(75) Inventors: Yoshitomo Tokumoto, Nabari (JP);
Toshiharu Ishihara, Kashiwara (JP);
Takanori Hamada, Kashiwara (JP);
Naoki Nakane, Toyota (JP)

(73) Assignees: Jtekt Corporation, Osaka-shi, Osaka (JP); Denso Corporation, Kariya-shi, Aichi (JP)

( * ) Notice: Subject to any disclaimer, the term of this patent is extended or adjusted under 35 U.S.C. 154(b) by 103 days.

This patent is subject to a terminal disclaimer.

(21) Appl. No.: 11/579,948

(22) PCT Filed: May 10, 2005

(86) PCT No.: PCT/JP2005/008513
§ 371 (c)(1),
(2), (4) Date: Nov. 9, 2006

(87) PCT Pub. No.: WO2005/108943
PCT Pub. Date: Nov. 17, 2005

(65) Prior Publication Data
US 2008/0028870 A1   Feb. 7, 2008

(30) Foreign Application Priority Data
May 11, 2004   (JP)   ............ 2004-141496
Jun. 3, 2004   (JP)   ............ 2004-165725

(51) Int. Cl.
*G01L 3/02*   (2006.01)
(52) U.S. Cl. .............................. 73/862.333
(58) Field of Classification Search ...............
73/862.331–862.333
See application file for complete search history.

(56) References Cited

U.S. PATENT DOCUMENTS

| | | | | |
|---|---|---|---|---|
| 5,351,555 A | * | 10/1994 | Garshelis | 73/862.335 |
| 6,928,887 B2 | * | 8/2005 | Nakane et al. | 73/862.331 |
| 7,051,602 B2 | * | 5/2006 | Nakane et al. | 73/862.333 |
| 2002/0189371 A1 | | 12/2002 | Nakane et al. | |
| 2003/0037622 A1 | | 2/2003 | Laidlaw | |
| 2003/0209087 A1 | | 11/2003 | Nakane et al. | |
| 2004/0074316 A1 | | 4/2004 | Nakane et al. | |

FOREIGN PATENT DOCUMENTS

| | | |
|---|---|---|
| JP | 2003-149062 A | 5/2003 |
| JP | 2003-329523 A | 11/2003 |
| JP | 2004-125717 A | 4/2004 |

* cited by examiner

*Primary Examiner*—Max Noori
(74) *Attorney, Agent, or Firm*—Birch, Stewart, Kolasch & Birch, LLP

(57) ABSTRACT

A torque detecting apparatus is provided which is capable of easily positioning a magnetic sensor in relation to a corresponding pair of magnetism collecting projections and thus improving the detection accuracy of the magnetic sensor without increasing the number of assembling and processing steps.

A pair of magnetism collecting projections 60 and 60 of each magnetism collecting ring 6 are arranged to extend not in their respective radial directions but substantially in parallel to each other while two magnetic sensors 7 and 7 are mounted to a circuit board 70 and inserted along the direction of projection of the magnetism collecting projections 60 and 60 into the air gaps respectively between the two magnetism collecting projection 60 and 60 of one magnetism collecting ring 6 and the two magnetism collecting projection 60 and 60 of the other magnetism collecting ring 6.

16 Claims, 22 Drawing Sheets

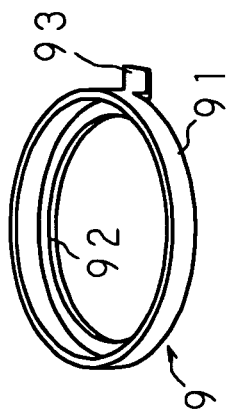
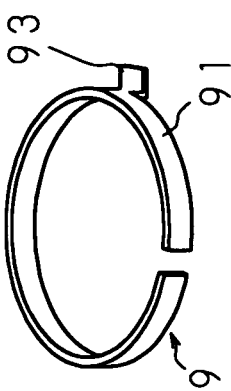
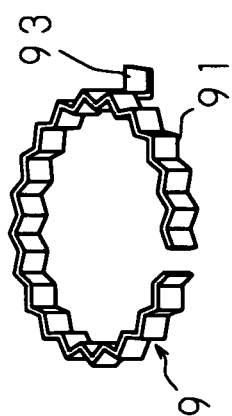
FIG. 19E   FIG. 19H   FIG. 19I
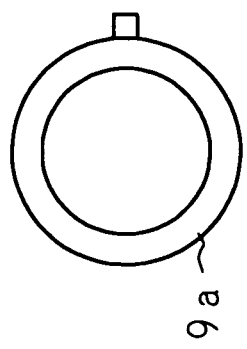
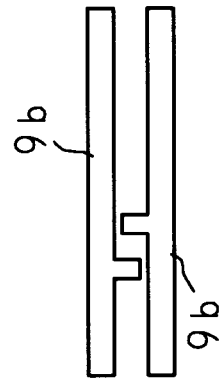
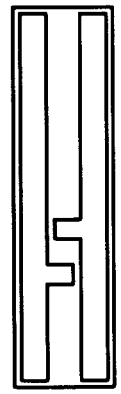
FIG. 19D   FIG. 19G
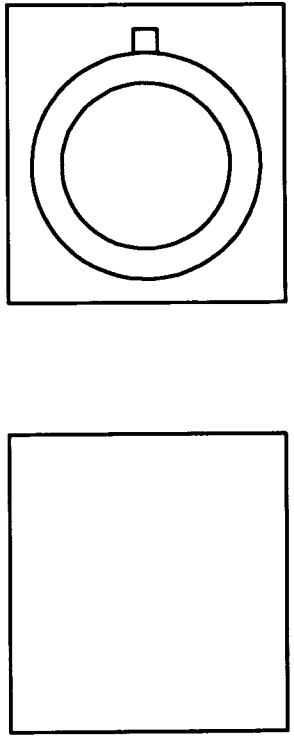
FIG. 19C   FIG. 19F
FIG. 19A   FIG. 19B

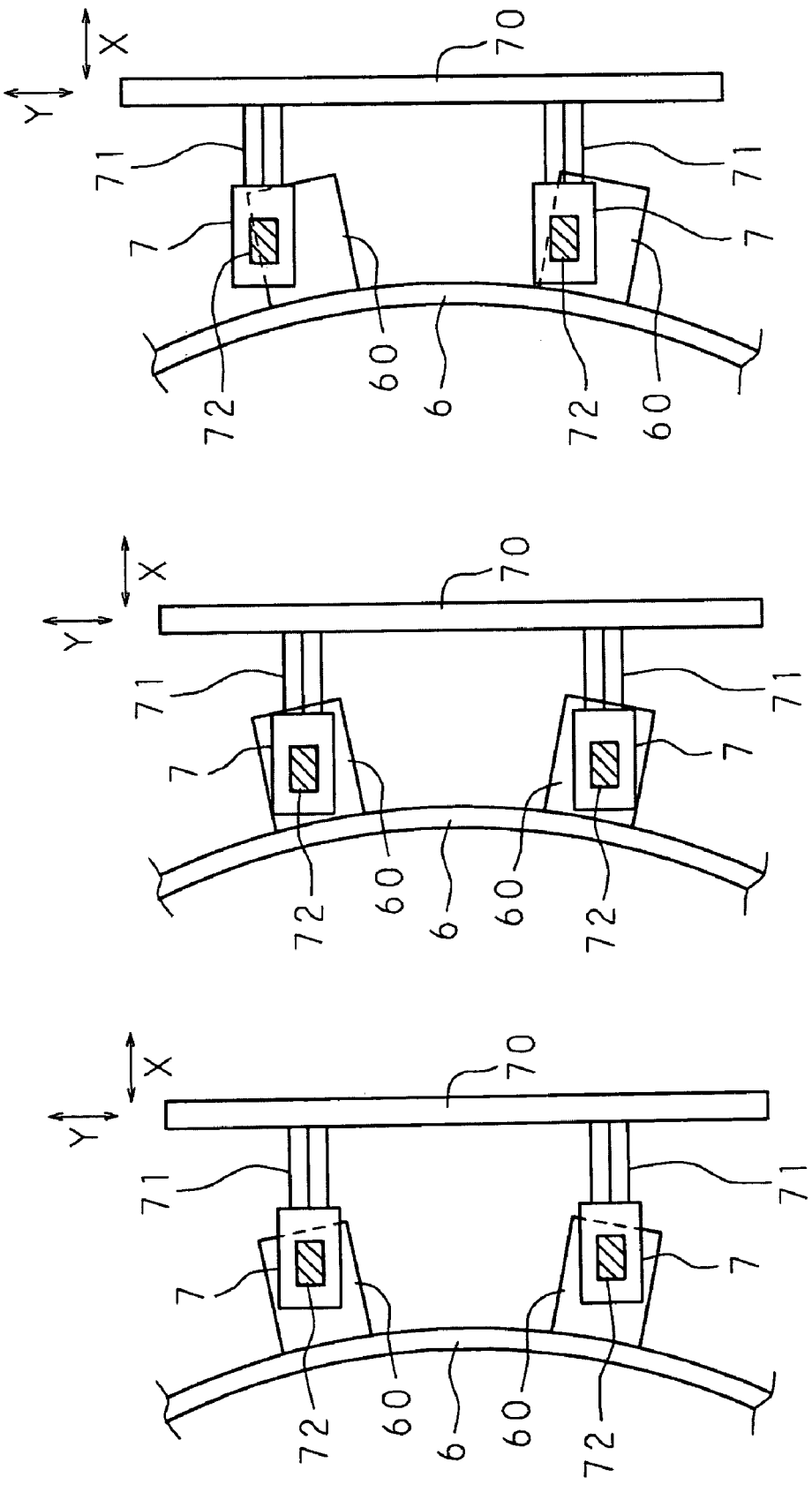

TORQUE DETECTING APPARATUS

This application is national phase under 35 U.S.C. §371 of PCT International Application No. PCT/JP2005/008513 which has an international filing date of May 10, 2005, and designated the United States of America

TECHNICAL FIELD

The present invention relates to a torque detecting apparatus for use in an electric power steering system, for example, to detect the torque of steering which is being loaded on a steering member during the steering action.

BACKGROUND ART

It is known for an electric power steering system arranged in response to the steering action of a steering member such as a steering wheel for driving an electric motor in order to transmit the driving force of the electric motor to a steering mechanism for assisting the action of steering that the steering torque exerted on the steering member has to be detected and used for controlling the action of the electric motor to optimize the assisting action and it is therefore needed for detecting the steering torque to employ a torque detecting apparatus which is mounted at a midway on the steering shaft between the steering member and the steering mechanism.

Such a torque detecting apparatus is generally arranged in which when the steering shaft to be examined has been separated into two, first and second, shafts joined to each other coaxially and is loaded with a steering torque by the steering action of the steering member, it creates a relative angle displacement between the first and second shafts from which the steering torque is then calculated. The first and second shafts are joined to each other by a torsion bar at a small diameter of which the torsion spring constant is predetermined for producing the relative angular displacement in proportion to the torque exerted.

The detection of the relative angular displacement between the first and second shafts may be implemented by various known means. One of the known means is a torque detecting apparatus which includes a cylindrical magnet arranged rotatable together with the first shaft and yoke rings arranged rotatable together with the second shaft to detect the relative angular displacement from a change in the magnetic circuit between the cylindrical magnet and the yoke ring (for example, as shown in Patent Citation 1).

As each of the yoke rings arranged rotatable together with the second shaft has a plurality of magnetic pole pawls provided on the circumference of a yoke body at a ring shape thereof to extend in the axial direction, the two yoke rings are fixedly mounted to the second shaft so as to face each other with their magnetic pole pawls aligning alternately along the circumferential direction. The cylindrical magnet arranged rotatable together with the first shaft comprises a set of multiple-pole magnets of which the magnetic poles are aligned along the circumferential direction in the same number as of the magnetic pole pawls of the yoke rings and is fixedly mounted to the first shaft so that their N and S poles correspond to those of the magnetic pole pawls of the yoke rings.

A pair of magnetism collecting rings for collecting the magnetic flux induced by the yoke rings are provided at the outside of the two yoke rings to surround closely the outside of the yoke bodies respectively. The magnetism collecting rings have magnetism collecting projections thereof provided to extend radially and outwardly while a magnetic detector device or magnetic sensor such as a Hall device is disposed between the two opposite magnetism collecting projections of their respective magnetism collecting rings which are spaced by an air gap from each other.

In action, when the first and second shafts receives a steering torque and are varied in the relative angular displacement between them, the positional relationship between the magnetic pole pawls of the yoke rings and the magnetic poles of the cylindrical magnet shifts in opposite directions thus to create a change in the magnetic flux on the yoke rings thus increasing or decreasing the magnetic flux received by the air gap between the two opposite magnetism collecting projections of their respective magnetism collecting rings. This results in a change in the output of the magnetic sensor from which the (steering) torque exerted on the first and second shafts can be calculated.

Since its magnetism collecting rings are located about the yoke rings, the torque detecting apparatus accompanied closely with vehicle mounted loudspeakers including permanent magnets may be affected by the magnetic field induced by the permanent magnets in the loudspeakers thus producing an error in the measurement of detection. It is hence contemplated for eliminating such an error in the measurement of detection derived from the external magnetic fields that the torque detecting apparatus is entirely protected with magnetic shielding members or its housing in which the first and second shafts are installed is coated with a magnetic shielding material.

Patent Citation 1: Japanese Patent Application Laid-Open No. 2003-149062.

DISCLOSURE OF THE INVENTION

Problems to Be Solved by the Invention

When the foregoing torque detecting apparatus is employed for detecting a steering torque in a vehicle, it has to carry a fail-safe scheme for the magnetic sensor. Such a fail-safe scheme is known where two or more magnetic sensors are disposed between corresponding pairs of the magnetism collecting projections provided on the circumferential sides of magnetism collecting rings and their outputs are then subjected to comparison for judging any failure of the measurement.

In general, as the two or more magnetic sensors are favorably connected to and physically supported closely by a common circuit board which includes a power supply circuit, an output processing circuit, and other peripheral circuits, their positioning between the corresponding pairs of the magnetism collecting projections is essential in the assembling process. However, the positioning will be carried out only with difficulty because the magnetism collecting projections are arranged to extend radially and outwardly from the circumferential side of each magnetism collecting ring.

FIG. 22 are explanatory views showing the above drawback of the conventional torque detecting apparatus. Denoted by 6 is the magnetism collecting ring which has two magnetism collecting projections 60 and 60 provided radially and outwardly on the circumference thereof as spaced from each other along the circumferential direction. Denoted by 7 and 7 are two magnetic sensors which are supported by a common circuit board 70 and extend in parallel to each other. The magnetic sensors 7 and 7 shown in FIG. 22 are positioned in a plan view relative to the magnetism collecting projections 60 and 60 while upper ones of the magnetism collecting projections 60 and 60 are not illustrated.

FIG. 22(a) illustrates the magnetic sensors 7 and 7 positioned correctly in relation to the magnetism collecting projections 60 and 60. As shown, the magnetic sensors 7 and 7 are positioned with their magnetic detecting areas 72 and 72 falling within and particularly at the center along the widthwise direction of the magnetism collecting projections 60 and 60. This positioning can be done by determining the position of the circuit board 70 in relation to the magnetism collecting ring 6 through inserting the magnetic sensors 7 and 7 into between the magnetism collecting projections 60 and 60 along the radial direction, denoted by X, of the magnetism collecting ring 6 (a direction of insertion of the magnetic sensors 7 and 7) and the tangent direction denoted by Y (a direction orthogonal to the direction of insertion of the magnetic sensors 7 and 7).

FIG. 22(b) illustrates the circuit board 70 incorrectly positioned along the radial direction X in relation to the magnetism collecting ring 6, where the magnetic detecting areas 72 and 72 of the magnetic sensors 7 and 7 are dislocated from the center of the magnetism collecting projections in the widthwise direction. If the positioning action is further carried out in the tangent direction Y from the above situation, the magnetic detecting area 72 of one of the two magnetic sensors 7 and 7 comes out of the magnetism collecting projection 60 thus disabling the detection of the torque at higher accuracy.

According, the conventional torque detecting apparatus requires a more number of steps for the assembling process including the positioning since the positioning of the magnetic sensors in relation to the magnetism collecting rings has to be carried out in two different directions.

Moreover, the conventional torque detecting apparatus has been adapted to minimize the air gap between the yoke ring and the cylindrical magnet, the air gap between the yoke ring and the magnetism collecting ring, and the air gap between the two opposite magnetism collecting projections as possible as it can, because the accuracy of the torque detection to depend on the magnitude of a change in the output of the magnetic sensor, and selectively determine the materials of the cylindrical magnet, the yoke rings, and the magnetism collecting rings for increasing the density of the magnetic flux to be intercepted by the magnetic sensors. Additionally, a high output type of the magnetic sensors has been employed for improving the accuracy of the torque detection.

It is however necessary for decreasing the air gap to improve the dimensional accuracy of the cylindrical magnet, the yoke rings, and the magnetism collecting rings as well as increasing the accuracy of the assembling process including the positioning step, whereby the number of steps for the processing and assembling action will be increased. In addition, when the materials of the cylindrical magnet, the yoke rings, and the magnetism collecting rings and the are optimized and the high output type of the magnetic sensors is employed, the overall cost of the apparatus will increase.

Also, when the torque detecting apparatus is protected entirely with magnetic shielding members or the housing for accommodating the first and second shafts is coated with a magnetic shielding material, the magnetic shielding area covered with the magnetic shielding materials becomes comparatively large thus increasing the overall cost.

The present invention has been developed in view of the above aspects and its object is to provide a torque detecting apparatus which is capable of easily positioning the magnetic sensors in relation to the corresponding pairs of the magnetism collecting projections and improving the detection accuracy of the magnetic sensors without increasing the number of steps for the processing and assembling action, thus ensuring higher levels of both the detection accuracy and the detection sensitivity.

Another object of the present invention is to provide a torque detecting apparatus which is capable of minimizing detection errors caused by external magnetic fields while decreasing the magnetic shielding area in the detection. A further object of the present invention is to provide a torque detecting apparatus which is capable of decreasing the cost of the magnetism collecting rings. A still further object of the present invention is to provide a torque detecting apparatus which is capable of improving the efficiency of the action of assembling the magnetism collecting rings and the magnetic shielding members.

Means for Solving the Problems

As a first feature of the present invention, a torque detecting apparatus having a cylindrical magnet arranged for rotating together with one of two, first and second, shafts joined coaxially to each other, a pair of yoke rings arranged for rotating together with the other of the two, first and second, shafts in a magnetic field induced by the cylindrical magnet, a pair of magnetism collecting rings arranged to surround the two yoke rings from the outer side respectively, and a magnetic sensor disposed between two opposite magnetism collecting projections provided outwardly on the outer side of the magnetism collecting rings respectively, for detecting a torque exerted on the first and second shafts from the density of the magnetic flux induced between the two opposite magnetism collecting projections and measured by the magnetic sensor, is provided as characterized in that pairs of the magnetism collecting projections are arranged at two or more locations on the circumference of the magnetism collecting rings to extend substantially in parallel with each other and the magnetic sensors are inserted along the direction of projection into between the corresponding pairs of the magnetism collecting projections.

According to the first feature of the present invention, the magnetism collecting projections of the magnetism collecting rings are arranged at two or more locations on the circumference of the magnetism collecting rings to extend substantially in parallel with each other but not in radial directions while the magnetic sensors are inserted along the direction of projection into between the corresponding pairs of the magnetism collecting projections and their measurements can be examined for determining the torque exerted. As the result, the positional relationship between the magnetic sensors and the magnetism collecting projections can favorably be realized by adjusting the position along the direction orthogonal of the direction of insertion without suffering from the effect of positional errors of the magnetic sensors along the direction of insertion or the direction of projection of the magnetism collecting projections, hence decreasing the number of steps for the assembling action with no declination in the accuracy of the torque detection.

As a second feature of the present invention, the torque detecting apparatus of the first feature may be modified as characterized in that the magnetism collecting projections are arranged of a rectangular shape of which the length T1 along the direction of projection and the width T2 along a direction orthogonal to the direction of projection are predetermined so that the following statements are satisfied where E1 and E2 are the length and the width respectively of the detecting area of the magnetic sensor, $0.1(mm) < (T1 - E1) < 10(mm)$ and $0.1(mm) < (T2 - E2) < 10(mm)$.

According to the second feature of the present invention, the magnetic sensors are easily positioned in relation to the magnetism collecting projections, hence allowing the size of the magnetism collecting projections to be optimized corresponding to the magnetic detecting areas of the magnetic sensors in order to increase the density of the magnetic flux measured by the magnetic sensors and then the output of the magnetic sensors for improvement of the accuracy of the torque detection.

As a third feature of the present invention, a torque detecting apparatus having a cylindrical magnet arranged for rotating together with one of two, first and second, shafts joined coaxially to each other, a pair of yoke rings arranged for rotating together with the other of the two, first and second, shafts in a magnetic field induced by the cylindrical magnet, a pair of magnetism collecting rings arranged to surround the two yoke rings from the outer side respectively, and a magnetic sensor disposed between two opposite magnetism collecting projections provided outwardly on the outer side of the magnetism collecting rings respectively, for detecting a torque exerted on the first and second shafts from the density of the magnetic flux induced between the two opposite magnetism collecting projections and measured by the magnetic sensor, is provided as characterized in that the magnetism collecting projections are arranged to increase the width enough to accept two or more of the magnetic sensors which are disposed along the circumferential direction of the magnetism collecting rings.

According to the third feature of the present invention, the magnetism collecting projections provided to extend outwardly from the circumferential sides of the magnetic collecting rings are increased in the width along the circumferential direction of the magnetism collecting rings so that two or more of the magnetic sensors can be aligned along the circumferential direction, allowing the torque exerted to be calculated from the outputs of the magnetic sensors. Since the outputs of the magnetic sensors sandwiched between a pair of the common magnetism collecting projections remain affected uniformly by external disturbances such as magnetic fields or ambient temperatures, they can minimize a declination in the measurement and thus improve the accuracy of the torque detection.

As a fourth feature of the present invention, the torque detecting apparatus of any of the first to third features is provided as characterized in that the magnetism collecting projections are arranged to be bent at their side edges in opposite directions where the two opposite magnetism collecting projections depart from each other.

According the fourth feature of the present invention, the two opposite magnetism collecting projections are bent at both side edges to separate from each other for easing the concentration of the magnetic flux at the side edges and increasing the density of the magnetic flux at the center which corresponds to the detecting area of the magnetic sensors, whereby the accuracy of the torque detection will be improved.

As a fifth feature of the present invention, the torque detecting apparatus of any of the first to fourth features may be modified as characterized by an adjusting means for moving one of the two magnetism collecting rings to and from the other in order to modify the distance between any two opposite magnetism collecting projections.

According to the fifth feature of the present invention, the positioning of the magnetic sensors is facilitated by moving one of the two magnetism collecting rings to and from the other with the distance between the two opposite magnetism collecting projections being increased while the distance between the two opposite magnetism collecting projections is decreased as possible as it can by moving the magnetism collecting rings to and from each other after the positioning to increase the density of the magnetic flux between the two opposite magnetism collecting projections, whereby the outputs of the magnetic sensors will be increased to improve the accuracy of the torque detection.

As a sixth feature of the present invention, the torque detecting apparatus of any of the first to fifth features may be modified as characterized by, while three or more of the magnetic sensors are provided, a judging means for examining from the principle of majority rule whether the measurement is correct or not.

According to the sixth feature of the present invention, the three or more magnetic sensors are compared with each other through examining a difference between their measurements. When its measurement is different from the others and found as a detection error, the magnetic sensor can certainly be judged as a failure.

As a seventh feature of the present invention, a torque detecting apparatus having magnetism collecting rings provided about a magnetic circuit generating member mounted to a rotating body for collecting the magnetic flux induced by the magnetic circuit generating member and a detector for detecting from the magnetic flux collected by the magnetism collecting rings a torque exerted on the rotating body, is provided as characterized in that the magnetism collecting rings have magnetic shielding layers provided on the outer side thereof.

According to the seventh feature of the present invention, the magnetic shielding layers are provided on the outer side of the magnetism collecting rings arranged for collecting the magnetic flux induced by the magnetic circuit generating member, thus minimizing the effect of external magnetic fields on the action of the magnetism collecting rings for collecting the magnetic flux and decreasing detection errors caused by the external magnetic fields. In addition, since the magnetic shielding layers cover the outer side of the magnetism collecting rings, their magnetic shielding area can favorably be reduced.

As an eighth feature of the present invention, the torque detecting apparatus may be modified as characterized in that the magnetic shielding layers are non-magnetic sheets fitted onto the magnetism collecting rings and arranged of an annular shape which has an open gap provided in the circumference thereof and projections provided extending radially and outwardly from an intermediate location of the circumference thereof.

According to the eighth feature of the present invention, two of the magnetic shielding layers can be fabricated from a single belt-like sheet of a non-magnetic material. As compared with shaping a non-magnetic material sheet into an annular form, the area for removing the non-magnetic material will be reduced.

As a ninth feature of the present invention, a torque detecting apparatus having a pair of magnetism collecting rings provided about a magnetic circuit generating member mounted to a rotating body as spaced from each other along the axial direction for collecting the magnetic flux induced by the magnetic circuit generating member and a detector for detecting from the magnetic flux collected by the magnetism collecting rings a torque exerted on the rotating body, is provided as characterized in that the magnetism collecting rings are arranged of a cylindrical shape having a projection extended from one location of the circumference thereof radially and outwardly and magnetic shielding layers for magnetically shielding the circumference, the end sides, and a region of the projection thereof.

According to the ninth feature of the present invention, the magnetic shielding layers are provided over the circumference, the end sides outwardly of the axial direction, and a region of the projection (outwardly of the axial direction at one side where the detector is not present) of the magnetism collecting rings, the effect of external magnetic fields over the action of the magnetism collecting rings for collecting the magnetic flux will be declined thus minimizing the detection errors caused by the external magnetic fields. In addition, as the magnetic shielding layers cover the circumference, the end sides outwardly of the axial direction, and a region of the projection (outwardly of the axial direction at one side where the detector is not present) of the magnetism collecting rings, their magnetic shielding area can be minimized.

As a tenth feature of the present invention, the torque detecting apparatus may be modified as characterized in that the magnetism collecting rings and their magnetic shielding layers are made by molding a synthetic resin material.

According to the tenth feature of the present invention, the magnetism collecting rings and their magnetic shielding layers are made by molding a synthetic resin material, hence decreasing the number of primary components to be used and minimizing the number of steps for the assembling action.

ADVANTAGES OF THE INVENTION

The torque detecting apparatus according to the first to fourth features of the present invention allows the magnetism collecting projections of the magnetism collecting rings are optimized in the arrangement, whereby the number of steps for the assembling process including the step of positioning the magnetic sensors in relation to the magnetism collecting projects can be reduced, the effect of external magnetic disturbance over the magnetic sensors can be minimized, and the action of the torque detection can be carried out at higher accuracy and sensitivity with much ease as well as less cost.

The apparatus according to the fifth feature of the present invention allows the air gap between the two opposite magnetism collecting projections to be controllably increased or decreased by moving the magnetism collecting rings to and from each other, whereby the outputs of the magnetic sensors can be increased and the torque detection can be improved in the accuracy and sensitivity. The apparatus according to the sixth feature of the present invention allows the three or more magnetic sensors to be compared with each other through examining a difference between their measurements, whereby when its measurement is different from the others and found as a detection error, the magnetic sensor can certainly be judged as a failure.

The torque detecting apparatus according to the seventh and ninth features of the present invention can minimize the effect of external magnetic fields on the action of the magnetism collecting rings for collecting the magnetic flux, decrease the detection errors caused by the external magnetic fields, and reduce the magnetic shielding area of the magnetic shielding layers, thus declining the overall cost thereof.

The torque detecting apparatus according to the eighth feature of the present invention allows two of the magnetic shielding layers to be fabricated from a single belt-like sheet of a non-magnetic material, whereby as compared with shaping a non-magnetic material sheet into an annular form, the area for removing the non-magnetic material can be reduced and the overall cost of the torque detecting apparatus can be minimized.

The apparatus according to the tenth feature of the present invention allows the magnetism collecting rings and their magnetic shielding layers to be made by molding a synthetic resin material, whereby the number of primary components to be used can be reduced and the number of steps for the assembling action can be minimized.

BRIEF DESCRIPTION OF THE DRAWINGS

FIG. 19 are explanatory views showing steps of shaping magnetic shielding layers in the torque detecting apparatus according to the present invention;

FIG. 22 are explanatory views showing a drawback in a conventional torque detecting apparatus.

DESCRIPTION OF NUMERALS

Figure 1:
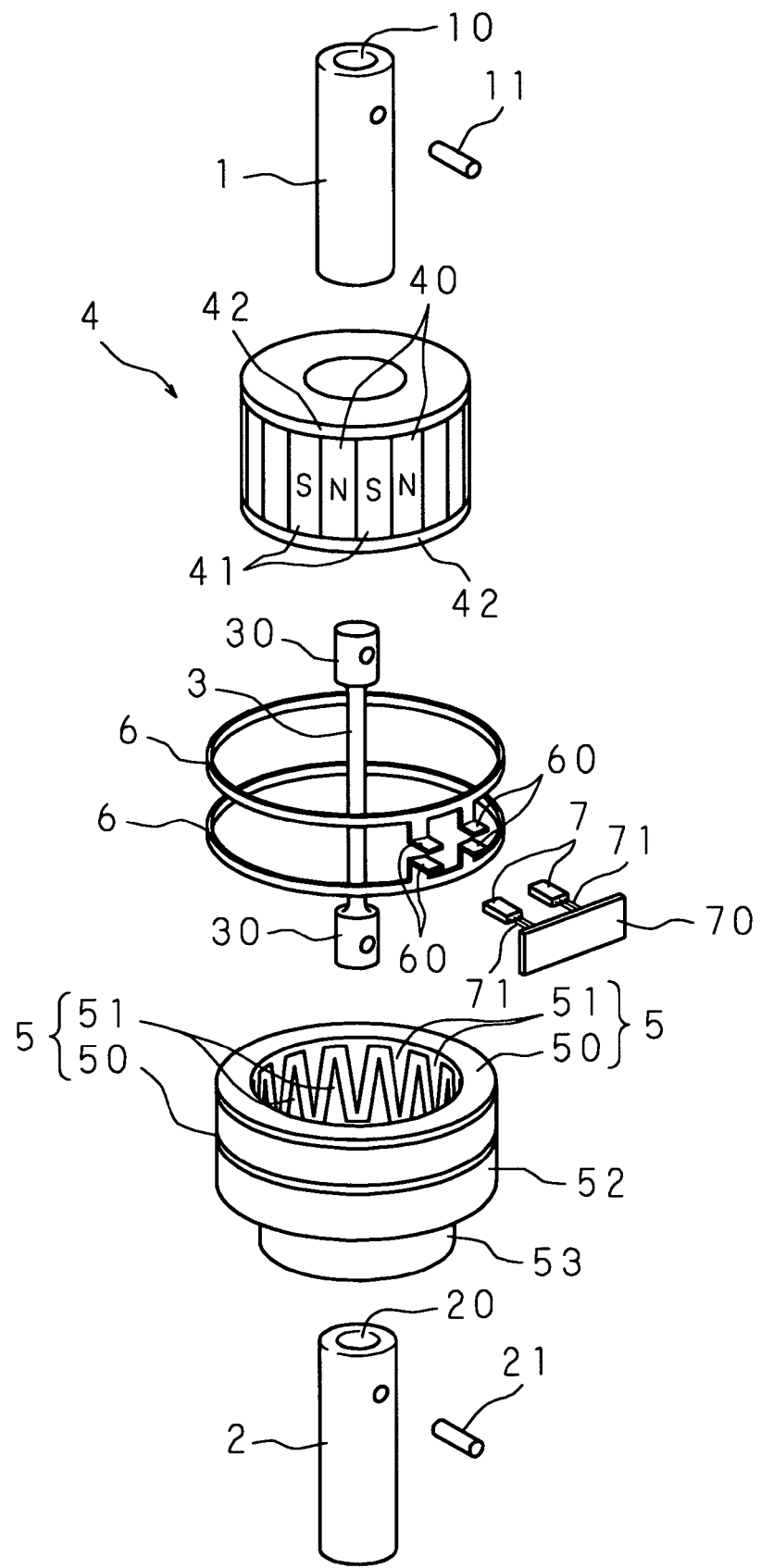
FIG. 1 is an exploded perspective view of a torque detecting apparatus showing Embodiment 1 of the present invention.

1. First shaft (rotating body)
2. Second shaft (rotating body)
3. Torsion bar
4. Cylindrical magnet (magnetic circuit generating member)
5. Yoke ring (magnetic circuit generating member)
6. Magnetism collecting ring
7. Magnetic sensor
40. N (magnetic) pole
41. S (magnetic) pole
60. Magnetism collecting projection
65. Adjusting nut (adjusting means)
66. Side edge
A. Torque detecting apparatus
9. Magnetic shielding layer
93. Extension (sheet-like coating).

BEST MODES FOR EMBODYING THE INVENTION

Preferred embodiments of the present invention will be described in more detail referring to the relevant drawings.

Embodiment 1

Figure 2:
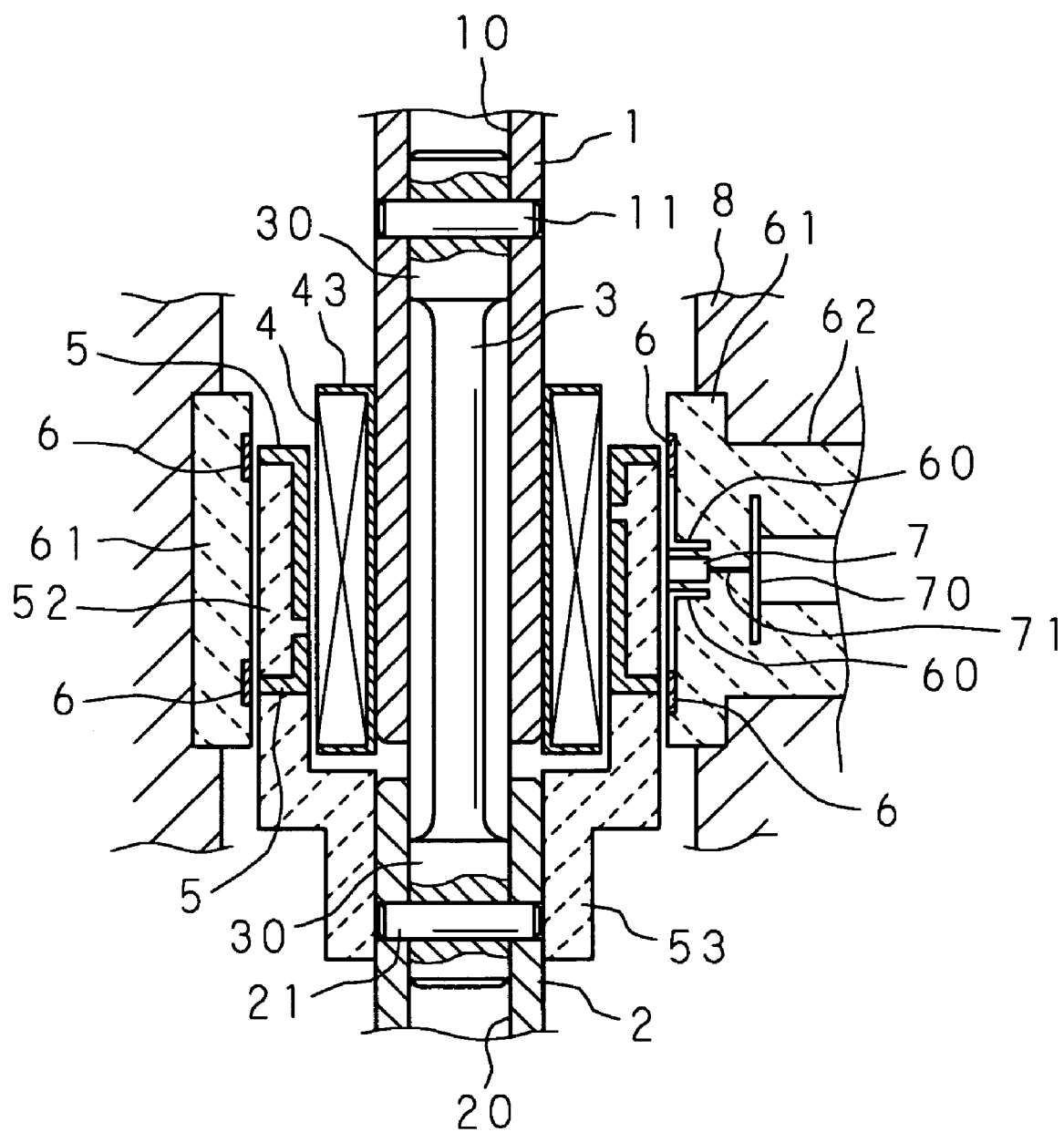
FIG. 2 a longitudinally cross sectional view of the torque detecting apparatus of the embodiment at the assembled state.

FIG. 1 is an exploded perspective view of a torque detecting apparatus showing Embodiment 1 of the present invention and FIG. 2 is a longitudinally cross sectional view of the same in its assembled state.

The torque detecting apparatus according to the present invention is designed for detecting the torque exerted on two rotating members or shafts (a first shaft 1 and a second shaft 2) which are joined coaxially to each other by a torsion bar 3 and thus comprises a cylindrical magnet 4 arranged rotatable together with the first shaft 1, a pair of yoke rings 5 and 5 arranged rotatable together with the second shaft 2, a pair of magnetism collecting rings 6 and 6 provided to elastically surround the yoke rings 5 and 5 respectively for receiving the magnetic flux generated in the yoke rings 5 and 5, and a pair of magnetic sensors 7 and 7 provided between the two magnetism collecting rings 6 and 6 to act as a group (two in the drawings) of detectors which will be explained later in more detail.

The torsion bar 3 has two joint portions 30 and 30, large in the diameter and short in the length, provided at both ends of a round bar at a small diameter thereof for joining the first shaft 1 and the second shaft 2 respectively. The first shaft 1 and the second shaft 2 have joint holes 10 and 20 respectively provided therein through the axial center for accepting the two joint portions 30 and 30 of the torsion bar 3. The torsion bar 3 is joined to the first shaft 1 and the second shaft 2 with its joint portions 30 and 30 inserted into the corresponding joint holes 10 and 20 of the first and second shafts 1 and 2 and tightened using two joint pins 11 and 21 respectively after an action of positioning along the circumferential direction which will be explained later.

When a rotating torque is applied onto the first shaft 1 and the second shaft 2 joined to each other, it causes the torsion bar 3 to be twisted and distorted thus creating a degree of the relative angular displacement between the first shaft 1 and the second shaft 2 corresponding to the intensity of the rotating torque.

The cylindrical magnet 4 arranged rotatable together with the first shaft 1 and the yoke rings 5 and 5 arranged rotatable together with the second shaft 2 are magnetic circuit forming members. As shown in FIG. 1, the cylindrical magnet 4 comprises a multi-pole magnet having a row of magnetic poles (an alternate combination of N poles 40 and S poles 41) provided along the circumference thereof and a mold resin material 42 arranged to cover both ends and the inner side of the multi-pole magnet and is thus fixedly mounted coaxially on the first shaft 1 by the mold resin material 42.

Each of the yoke rings 5 and 5 arranged rotatable together with the second shaft 2 is, as shown in FIG. 1, a ring form made of a magnetic material and having a group of axially extending magnetic pawls 51 provided circumferentially on the inner side of an annular yoke body 50 thereof. The magnetic pawls 51 of the two yoke rings 5 and 5 are formed of a triangle shape which become narrower towards the distal end, arranged alternately along the circumferential direction between the two yoke rings 5 and 5 to face each other at the distal end side as remain integral with the mold resin 52 molded to a tubular shape, and joined by a boss 53, which is formed by extending one end of the mold resin 52, fixedly and coaxially onto the end of the second shaft 2.

The yoke rings 5 and 5 are assembled so that their yoke bodies 50 and 50 with the magnetic pole pawls 51 come to face at the inner sides across an air gap with the outer side of the cylindrical magnet 4 fixedly mounted to the first shaft 1, as shown in FIG. 2.

Figure 3:
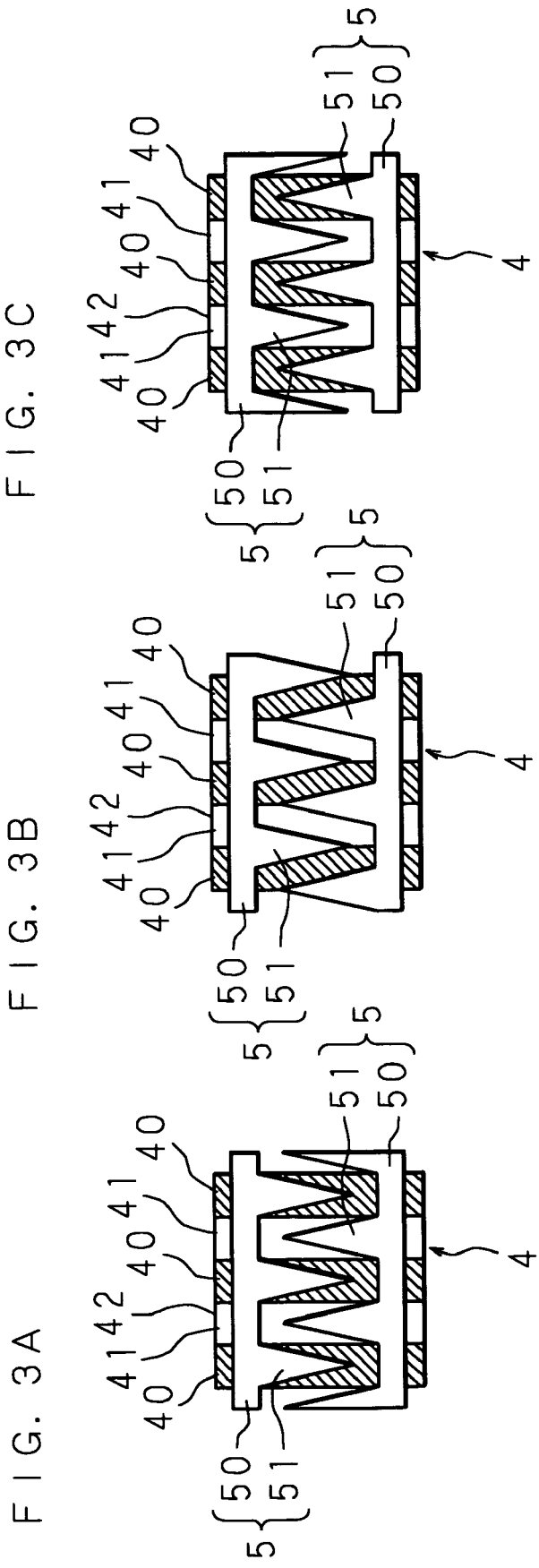
FIG. 3 are explanatory views showing the positional relationship along the circumferential direction between the magnetic pole pawls of yoke rings and the magnetic poles of a cylindrical magnet.

FIG. 3 are explanatory view showing the positional relationship between the magnetic pawls 51 of the two yoke rings 5 and 5 and a combination of the N poles 40 and the S poles 41 of the cylindrical magnet 4 along the circumferential direction. FIG. 3(b) illustrates the positional relationship at the assembled state where the magnetic pawls 51 of the two yoke rings 5 and 5 are arranged along the circumferential direction with their distal ends positioned at the boundary between the N poles 40 and the S poles 41 of the cylindrical magnet 4. This positioning is implemented by controlling the positional relationship along the circumferential direction between the two yoke rings 5 and 5 and the cylindrical magnet 4 on the two shafts 1 and 2 which are joined to each other by the torsion bar 3.

The assembled state shown in FIG. 3(b) permits the magnetic pawls 51 of the two yoke rings 5 and 5 to stay under uniform conditions in the magnetic field generated by any two, N and S, adjacent poles 40 and 41 along the circumference of the cylindrical magnet 4, hence making the magnetic fluxes uniform which are produced in the yoke bodies 50 which connect the magnetic pawls 51 together at the proximal end.

The positional relationship along the circumferential direction between the two yoke rings 5 and 5 and the cylindrical magnet 4 with the magnetic pawls 51 located at the boundary between the N pole 40 and the S pole 41 of the cylindrical magnet 4 is shifted in opposite directions shown in FIGS. 3(a) and 3(c) by the effect of the relative angular displacement derived from the twisting action between the first shaft 1 joined to the cylindrical magnet 4 and the second shaft 2 joined to the yoke rings 5 and 5, thus increasing the magnetic lines at opposite polarities between the magnetic pawls 51 of the yoke ring 5 and the magnetic pawls 51 of the other yoke ring 5 to develop the positive magnetic flux on the yoke ring 5 and the negative magnetic flux on the other yoke ring 5. The polarity of the magnetic flux is determined by the direction of the relative angular displacement between the cylindrical magnet 4 and the two yoke rings 5 and 5 or between the first shaft 1 and the second shaft 2 while its density depends on the degree of the relative angular displacement.

The magnetism collecting rings 6 and 6 for receiving the magnetic flux generated on the two yoke rings 5 and 5 are made of a magnetic material of which the inner diameter is slightly greater than the outer diameter of the yoke bodies 50, each ring 6 having two magnetism collecting projections 60 and 60 thereof separated from each other by a proper distance along the circumferential direction and arranged with their axially extending distal ends bent radially and outwardly. The magnetism collecting rings 6 and 6 are aligned axially so that their respective magnetism collecting projections 60 face each other with the two opposite bent portions spaced by an air gap and held in a cylindrical holder 61 made of a resin material. While being supported via the cylindrical holder 61 in a housing 8 which is partially shown in FIG. 2, the magnetism collecting rings 6 and 6 remain assembled with their inner sides facing close to the outer sides of the yoke bodies 50 and 50 of the two yoke rings 5 and 5 respectively.

A pair of magnetic sensors 7 and 7, such as Hall devices, are disposed between the opposite magnetism collecting projections 60 and 60 of the magnetism collecting rings 6 and 6 respectively. More specifically, the magnetic sensors 7 and 7 are projectingly supported by leads 71 provided on one side of a common circuit board 70 which carries peripheral circuits including a power supply circuit and a signal processor circuit and enclosed together with the circuit board 70 by a mold resin material 62 provided as a part of the cylindrical holder 61 so that they are positioned in the air gap between the magnetism collecting projections 60 and 60.

In action, the magnetic flux is generated in the yoke bodies 50 and 50 being rotated, transferred to the magnetism collecting rings 6 and 6, and received by the magnetism collecting projections 60 and 60 before filled up across the air gap between the two opposite magnetism collecting projections 60 and 60. The magnetic flux filled up across the air gap between the two opposite magnetism collecting projections 60 and 60 is then measured by the magnetic sensors 7 and 7 of which the outputs are in turn delivered from the circuit board 7 to the outside.

The magnetic flux measured by the magnetic sensors 7 and 7 is varied depending on the strength of magnetism generated on the yoke bodies 50 and 50 facing the magnetism collecting rings 6 and 6. As the magnetic flux generated on the yoke bodies 50 and 50 is determined by the relative displacement to the cylindrical magnet 4 or the relative angular displacement between the first shaft 1 and the second shaft 2, its measurement at the magnetic sensors 7 and 7 represents the direction and strength of the torque exerted on the first shaft 1 and the second shaft 2 and loaded to produce the relative angular displacement. Accordingly, the steering torque loaded to the first shaft 1 and the second shaft 2 can be calculated from the output of the magnetic sensors 7 and 7.

Figure 4:
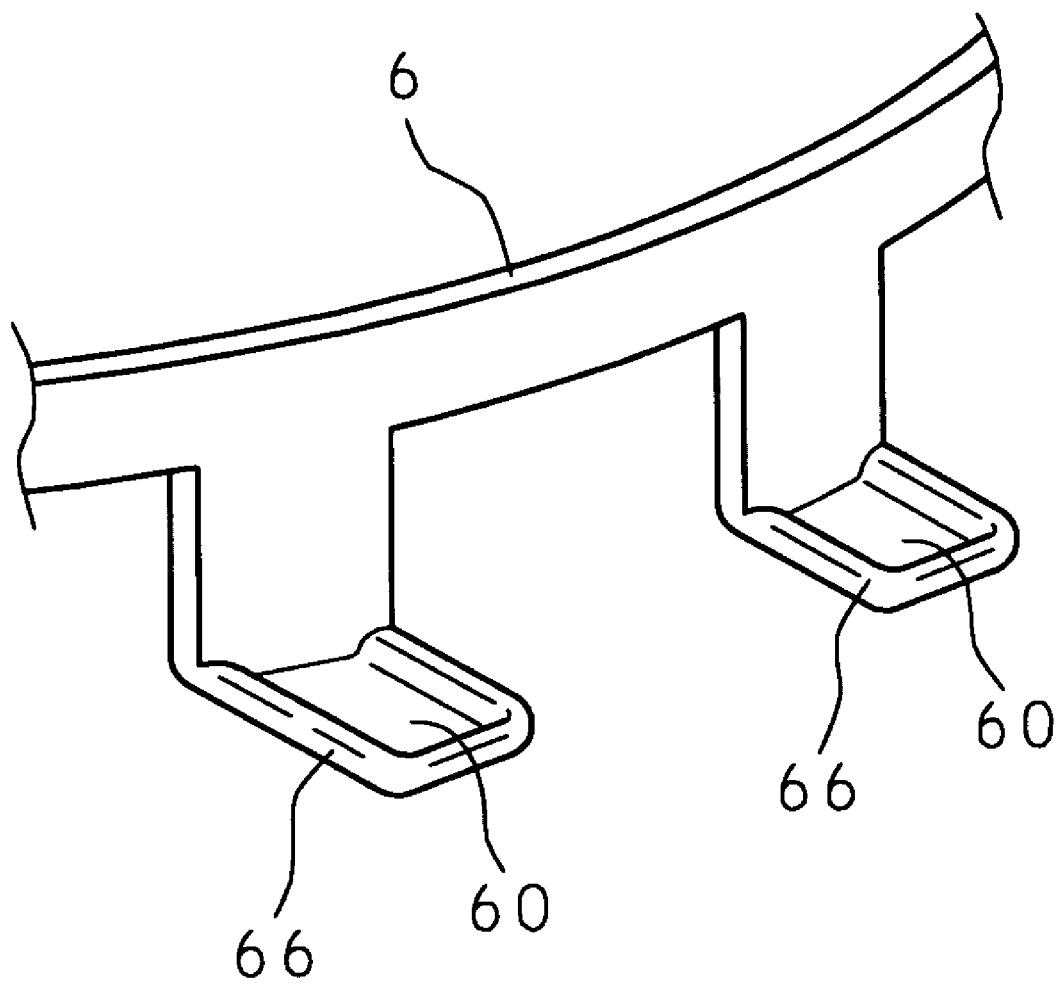
FIG. 4 is an external perspective view of a magnetism collecting ring.

The torque detecting apparatus according to the present invention is characterized by the arrangement of the magnetism collecting projections 60 and 60 of the two magnetism collecting rings 6 and 6. FIG. 4 is an external perspective view showing a primary of the magnetism collecting ring 6 where the two magnetism collecting projections 60 and 60 extend in parallel to each other radially of the magnetism collecting ring 6 at the midway between but not at the locations of the two magnetism collecting projections 60 and 60 as also shown in FIG. 1.

FIG. 5 are plan views showing the positional relationship between the magnetism collecting projections 60 and 60 and the corresponding magnetic sensors 7 and 7. As explained, the magnetism collecting projections 60 and 60 are separated from each other by the proper distance along the circumference of the magnetism collecting ring 6 and projectingly extend in parallel to each other. The magnetic sensors 7 and 7 projectingly extend from one side of the common circuit board 70 so that each of them is located between the two opposite magnetic collecting projections 60 and 60 along the direction of projection. Shown in FIG. 5 is the positional relationship between the magnetic sensors 7 and 7 and the magnetism collecting projections 60 and 60 of the magnetism collecting ring 6 while the opposite magnetism collecting projections 60 and 60 located over then magnetic sensors 7 and 7 are not illustrated.

Figure 5C:
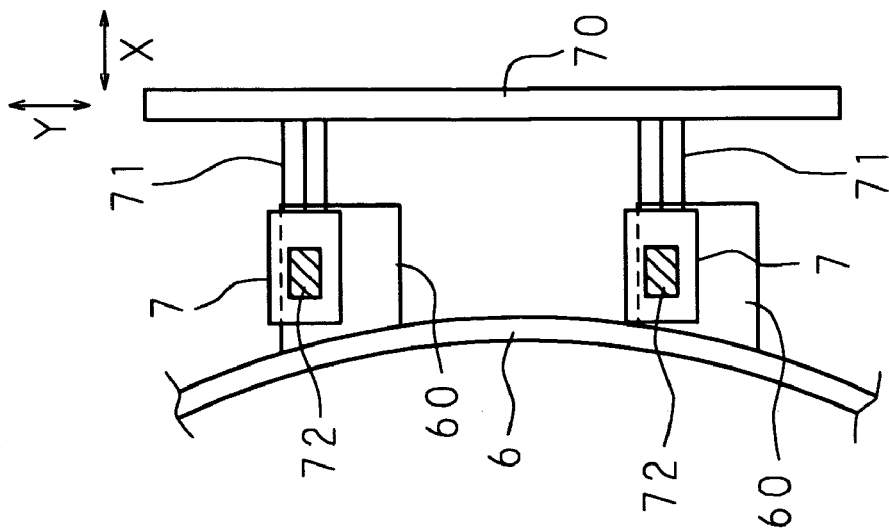
FIG. 5 are plan views showing the positional relationship between magnetism collecting projections and their corresponding magnetic sensors.
Figure 5B:
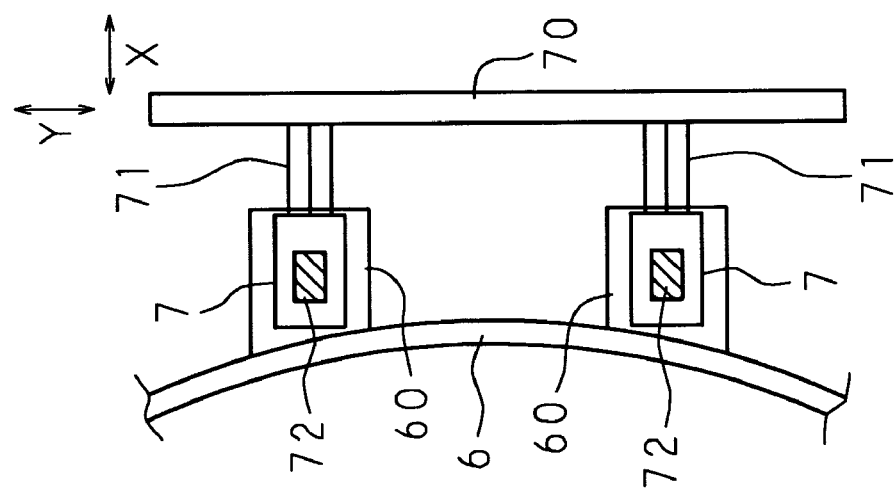
Figure 5A:
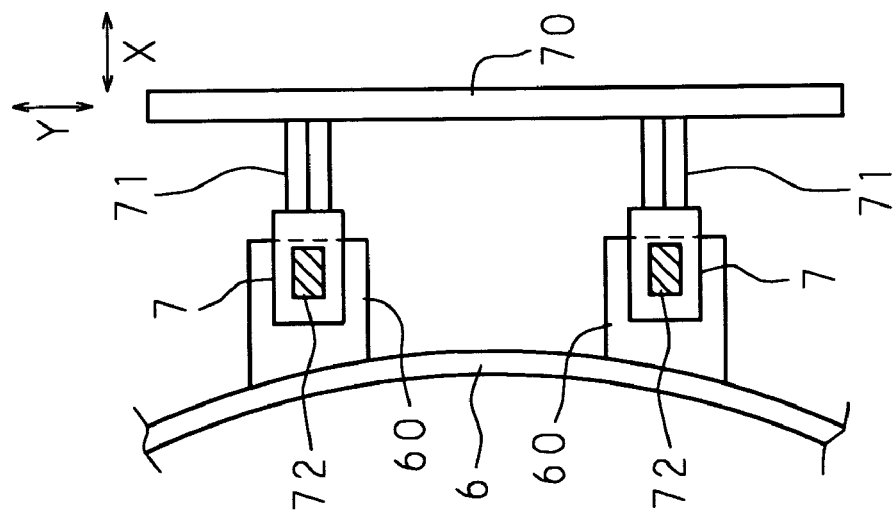

FIG. 5(a) illustrates the positional relationship where the magnetic sensors 7 and 7 are located at their correct position on the magnetism collecting projections 60 and 60 respectively. As shown, the magnetic sensors 7 and 7 are located at their correct position so that their substantially center areas or magnetic detecting regions 72 and 72 come on the inner side and overlap the center regions along the widthwise direction of the magnetism collecting projections 60 and 60, whereby the magnetic flux across the two magnetism collecting projections 60 and 60 can be measured with correctness and used for calculating the steering torque at higher accuracy. The magnetism collecting projections 60 and 60 of the magnetism collecting ring 6 can be located at their correct position by controlling the position of the common circuit board 70 to which the magnetic sensors 7 and 7 are mounted.

FIG. 5(b) illustrates the circuit board 70 biased in the position towards the magnetism collecting ring 6 along the direction of insertion of the magnetic sensors 7 and 7 as denoted by the direction X or the radial direction of the magnetism collecting ring 6. Since the magnetism collecting projections 60 and 60 extend in parallel to each other and the corresponding magnetic sensors 7 and 7 are arranged in parallel to the one side of the circuit board 70 in the torque detecting apparatus according to the present invention, the magnetic detecting areas 72 and 72 of the magnetic sensors 7 and 7 shown in FIG. 5(b) remain aligned at substantially the center along the widthwise direction but may be displaced only along the lengthwise direction of the magnetism collecting projections 60 and 60 and can hence measure the magnetic flux to be examined with correctness and calculate the torque exerted at higher accuracy.

Furthermore, even if the magnetic sensors 7 and 7 are biased from the above situation along a direction orthogonal to the direction of insertion or the direction of tangent, denoted by Y, of the magnetism collecting ring 6 as shown in FIG. 5(c), their magnetic detecting areas 72 and 72 remain overlapped with the magnetism collecting projections 60 and 60 within the range of a half the width of the magnetism collecting projections 60 and 60 and can thus allow the torque to be calculated at higher accuracy.

As the result, the torque detecting apparatus according to the present invention permits the torque to be detected at higher accuracy without correcting the position of the magnetic sensors 7 and 7 in relation to the corresponding magnetism collecting projections 60 and 60 of the magnetism collecting ring 6, hence significantly decreasing the number of assembling steps including the step of positional adjustment.

On the other hand, as the positional relationship between the magnetism collecting projections 60 and 60 and the corresponding magnetic sensors 7 and 7 is conducted with ease, the size at the plan view of the magnetism collecting projections 60 and 60 can be minimized. While the output of the magnetic sensors 7 and 7 is proportional to the density of the magnetic flux between the magnetism collecting projections 60 and 60 to be positioned, the downsizing of the magnetism collecting projections 60 and 60 can be expedient to improve the output of the magnetic sensors 7 and 7 or the accuracy of calculating the torque exerted.

Figure 6:
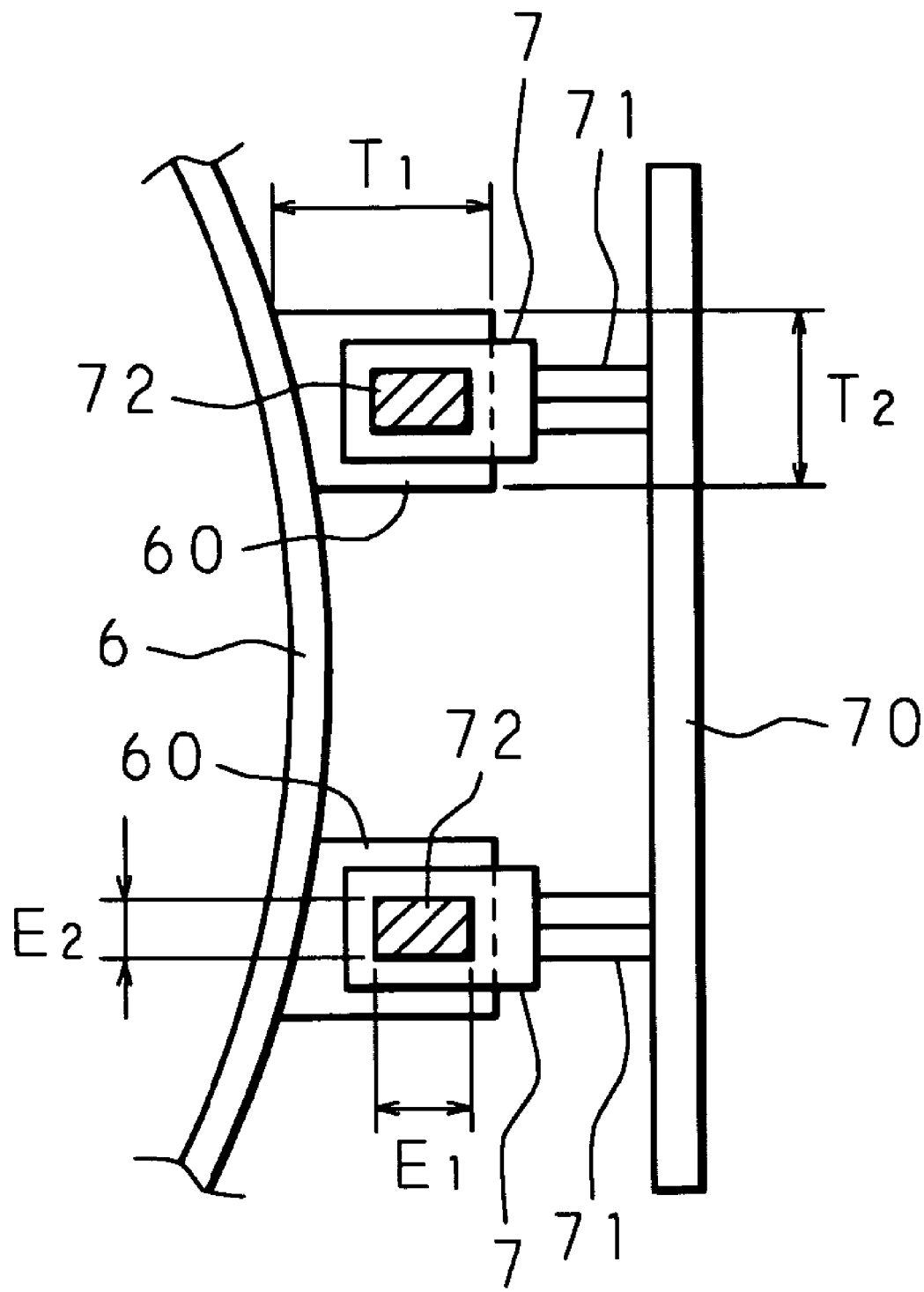
FIG. 6 is an explanatory view of the desired size of the magnetism collecting projections.

FIG. 6 is an explanatory view showing a recommendable size of the magnetism collecting projection 60. As shown, the length T1 along the direction of projection and the width T2 along a direction orthogonal to the direction of projection of the magnetism collecting projection 60 of a rectangular shape are determined in relation to the length E1 and the width E2 of the magnetic detecting area 72 of the magnetic sensor 7 for optimizing the accuracy of the detection, when the following conditions are satisfied.

$$0.1(mm) < (T1-E1) < 10(mm),$$

$$0.1(mm) < (T2-E2) < 10(mm).$$

Furthermore, the magnetism collecting projections 60 and 60 of the magnetism collecting ring 6 are bent at both side edges 66 and 66 so that the corresponding magnetism collecting projections 60 and 60 of the two opposite magnetism collecting rings 6 and 6 are more distanced from each other, as shown in FIG. 4. This allows the output of the magnetic sensors 7 and 7 to be improved thus increasing the accuracy of detecting the torque exerted.

Figure 7A:
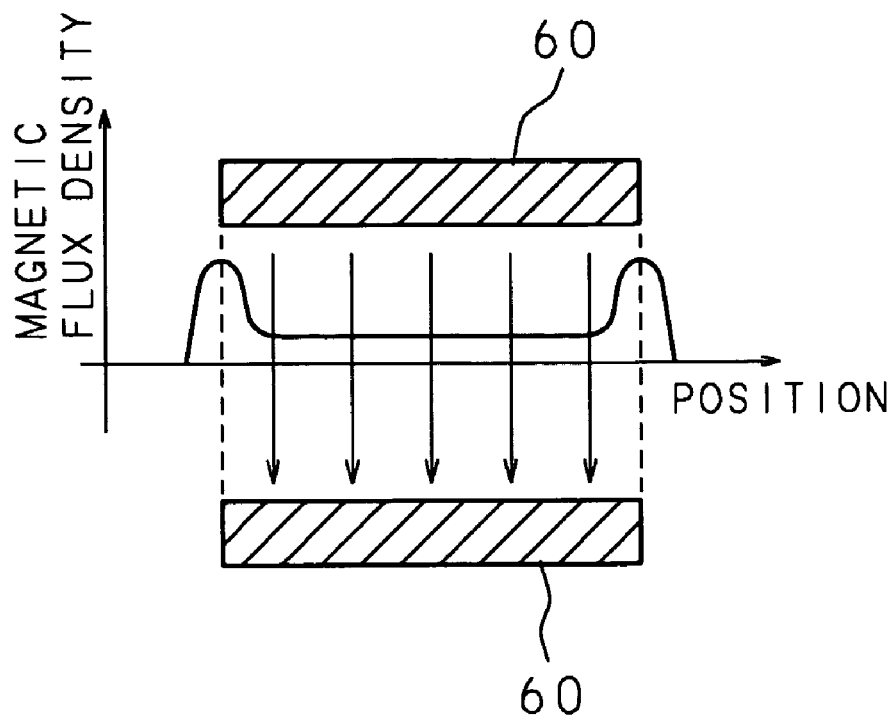
FIG. 7 are explanatory views showing the action of side edges of the magnetism collecting projection.
Figure 7B:
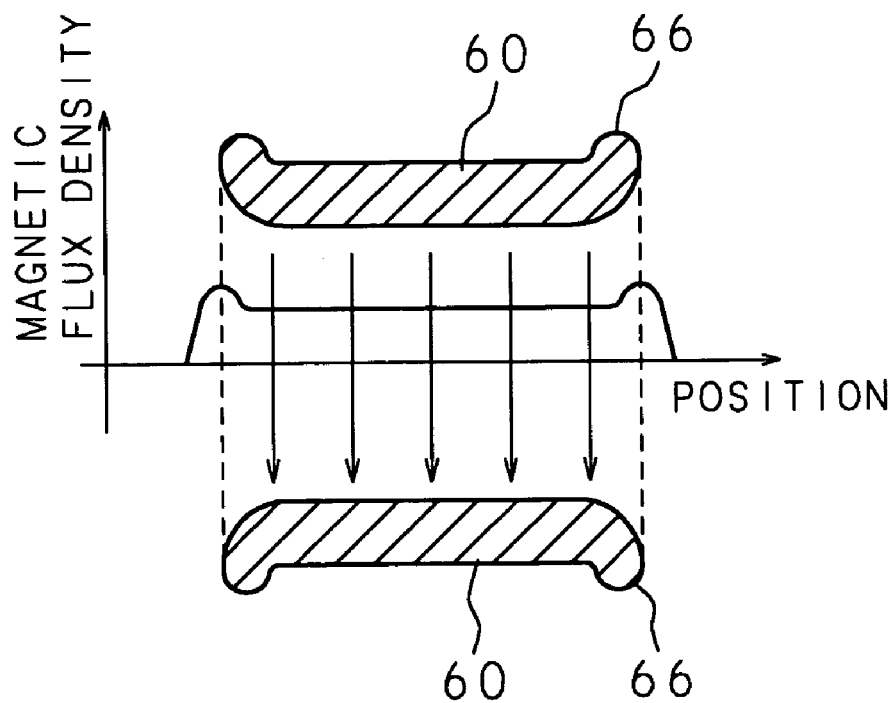

FIG. 7 are explanatory views showing the action of the side edges of the magnetism collecting projections 60 and 60. While FIG. 7(a) illustrates the magnetism collecting projections 60 and 60 remain flat at both side edges, FIG. 7(b) illustrates the two opposite magnetism collecting projections 60 and 60 bent in opposite directions at both side edges 66 and 66, similar to FIG. 4.

In case that the two opposite magnetism collecting projections 60 and 60 remain flat at both side edges, the air gap between the two is uniform throughout the width, permitting the density of the magnetic flux between the two magnetism collecting projections 60 and 60 to be intensified substantially at the edges as shown in a profile of FIG. 7(a) but not at the center regions of the magnetism collecting projections 60 and 60 which correspond to the detecting areas of the magnetic sensors and declining the output of the magnetic sensors.

However, when the two opposite magnetism collecting projections 60 and 60 are bent in opposite directions at the side edges 66 and 66, the air gap at the side edges 66 and 66 between the two is greater in the distance than that at the center regions. Accordingly, the density of the magnetic flux between the two magnetism collecting projections 60 and 60 can be less intensified substantially at the edges as shown in a profile of FIG. 7(b) and, in turn, increased at the center regions of the magnetism collecting projections 60 and 60 which correspond to the detecting areas of the magnetic sensors, hence increasing the output of the magnetic sensors and improving the accuracy of detecting the torque exerted.

It is also necessary for correctly positioning the magnetic sensors 7 and 7 in relation to the corresponding magnetism collecting projections 60 and 60 to securely hold the relationship between the magnetic sensors 7 and 7 and the common circuit board 70 to which the magnetic sensors 7 and 7 are mounted. However, the magnetic sensors 7 and 7 are supported by the leads 71 and 71 which also act as source lines, signal lines, and grounding lines and their positional accuracy may be interrupted by any external force exerted during the assembling process.

Figure 8:
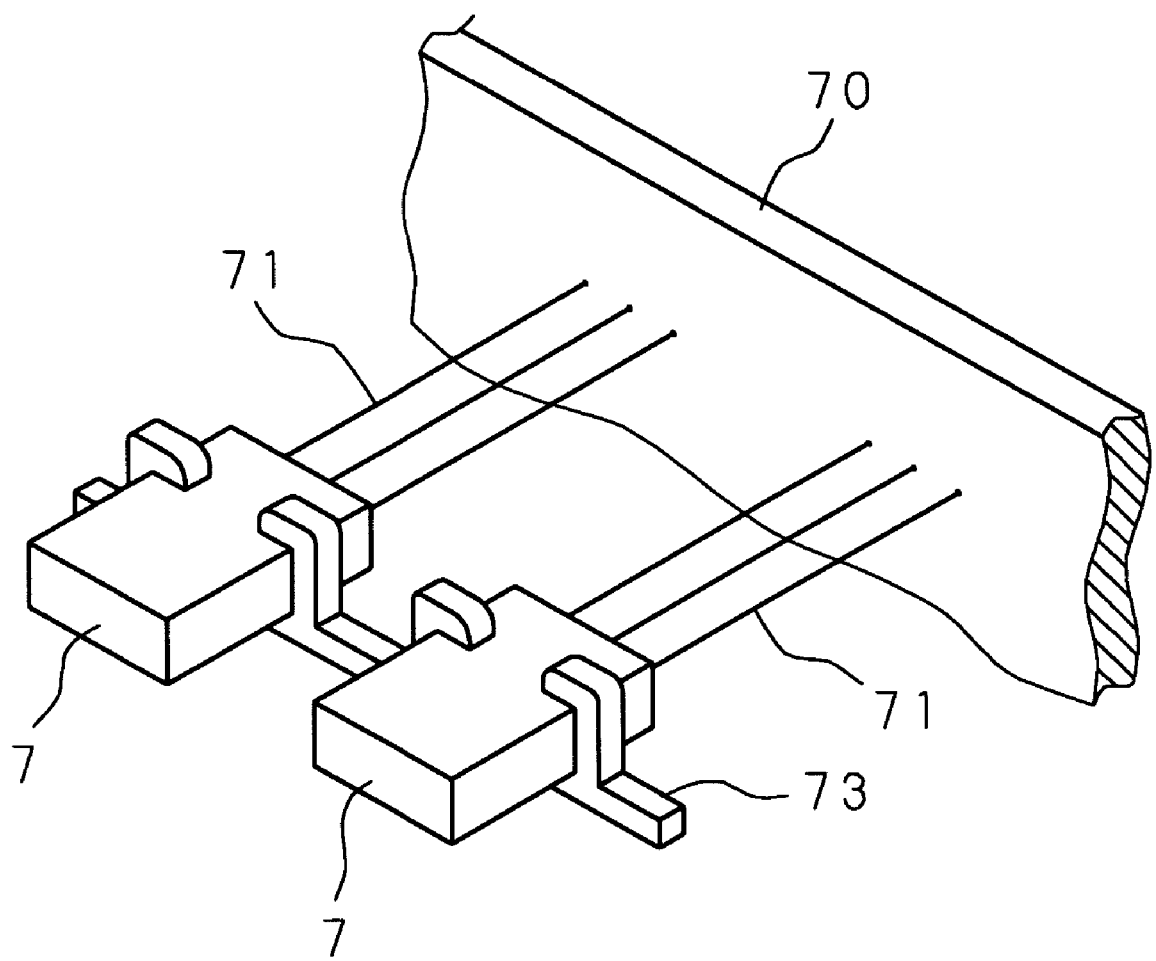
FIG. 8 is an explanatory view showing a desired supporting arrangement of the magnetic sensors.

FIG. 8 is an explanatory view showing a favorable arrangement for supporting the magnetic sensors 7 and 7. As shown, the magnetic sensors 7 and 7 are supported the corresponding leads 71 and 71 respectively mounted on the circuit board 70 and protected with a spacer 73 for holding the position relationship between the two magnetic sensors 7 and 7. The spacer 73 is provided in the form of a clip made of an insulating material such as resin material for clamping the two magnetic sensors 7 and 7 at a location close to the proximal end. The supporting arrangement prevents the magnetic sensors 7 and 7 from being dislocated during the assembling process, thus ensuring the correct positioning of the magnetic sensors 7 and 7 in relation to the magnetism collecting projections 60 and 60.

In the foregoing embodiment, the two magnetic sensors 7 and 7 are provided, one for detecting the torque exerted and the other for examining the failure of the detection. The action of examining the detection failure is conducted by comparing with time two outputs of the magnetic sensors 7 and 7 and, when a difference between the two outputs is apparently found, judging that one of the two magnetic sensors 7 and 7 of which the output has been not uniform is at the failure state.

Figure 9:
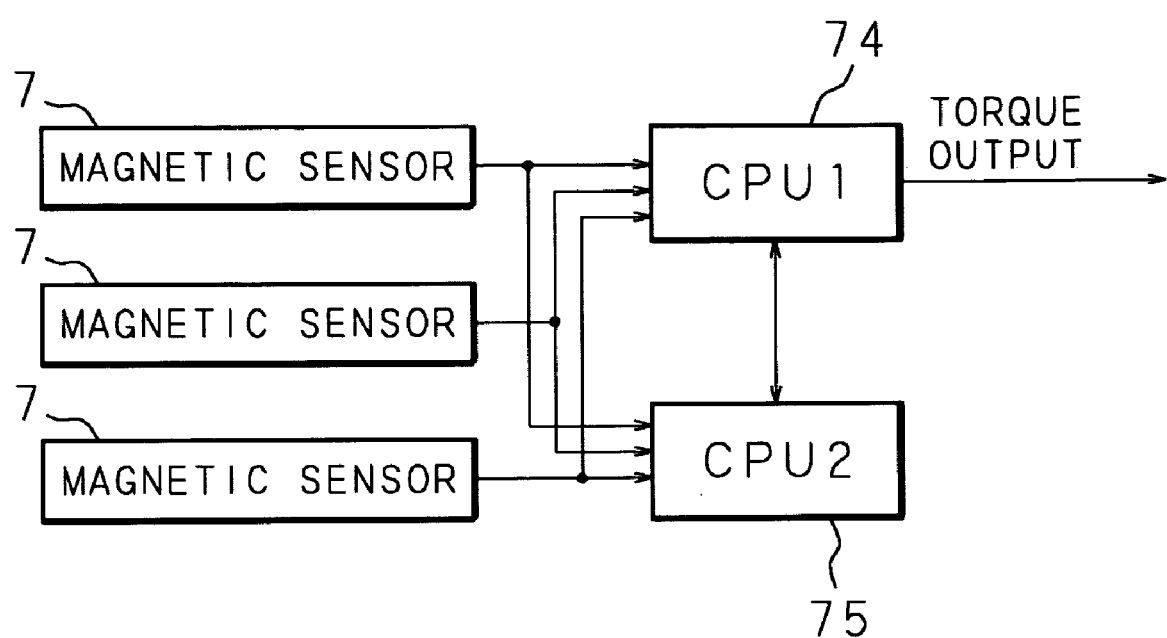
FIG. 9 is a block diagram of a circuitry arrangement of a fail judging means with three of the magnetic sensors connected.

The action of examining the detection failure may be improved in the accuracy when three or more of the magnetic sensors 7 are provided and accompanied with the following judging means. FIG. 9 is a block diagram of the judging means connected with the three magnetic sensors.

As shown, the outputs of the three magnetic sensors 7, 7, and 7 are received by two CPUs 74 and 75 for calculating the torque. The CPUs 74 and 75 upon receiving the three outputs $V_1$, $V_2$, and $V_3$ from the magnetic sensors 7, 7, and 7 calculate their differences $V_1$-$V_2$, $V_2$-$V_3$, and $V_3$-$V_1$ and judge a detection failure from the principle of majority rule over a combination of the differences which depart largely from zero. For example, when the two differences $V_1$-$V_2$ and $V_3$-$V_1$ depart from zero, it is then judged that the output $V_1$ contained in both the differences is a failure output and the magnetic sensor 7 which has released the output $V_1$ is at the failure state.

The two CPUs 74 and 75 are designed for conducting the action of examining the detection failure in order to avoid their own erroneous action. The CPUs 74 and 75 are connected to each other for exchanging desired information and their actions of examining the detection failure are constantly compared with each other. When the CPUs 74 and 75 judge the same, the calculation of the torque is carried out using correct ones of the three outputs $V_1$, $V_2$, and $V_3$ from the magnetic sensors 7, 7, and 7 before the calculated torque is released from one of the two CPUs (CPU 74 in the drawing).

One of the two CPUs 74 and 75 may be replaced by an analog circuit which contains arithmetic operation circuits for calculating differences between the outputs and a comparison circuit for comparing the outputs of the arithmetic operation circuits. The three magnetic sensors 7, 7, and 7 may be arranged to locate between their corresponding pairs of the magnetism collecting projections 60 and 60 which are provided to extend from three different positions from each magnetism collecting ring 6.

Figure 10:
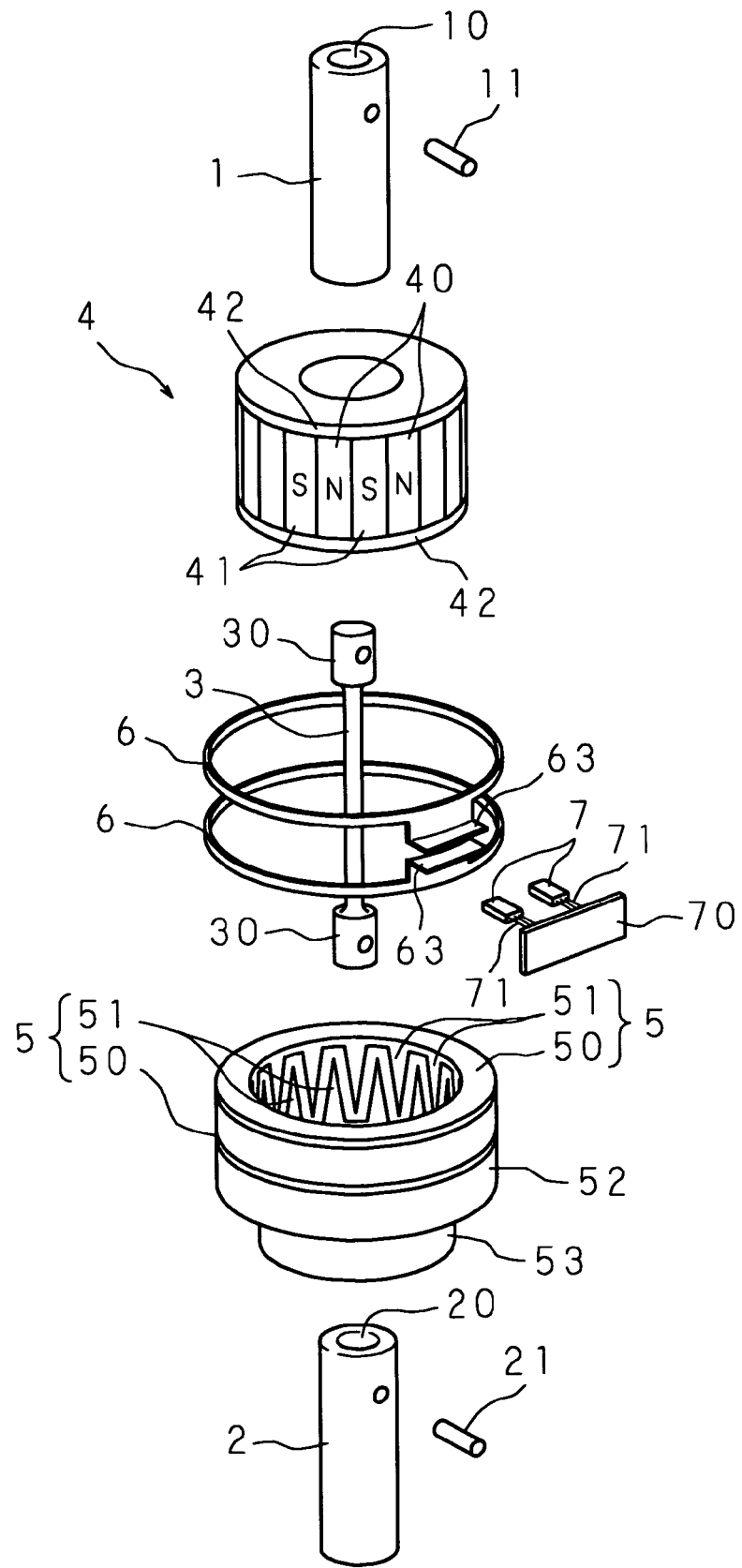
FIG. 10 is an exploded perspective view of a torque detecting apparatus showing Embodiment 2 of the present invention.
Figure 11:
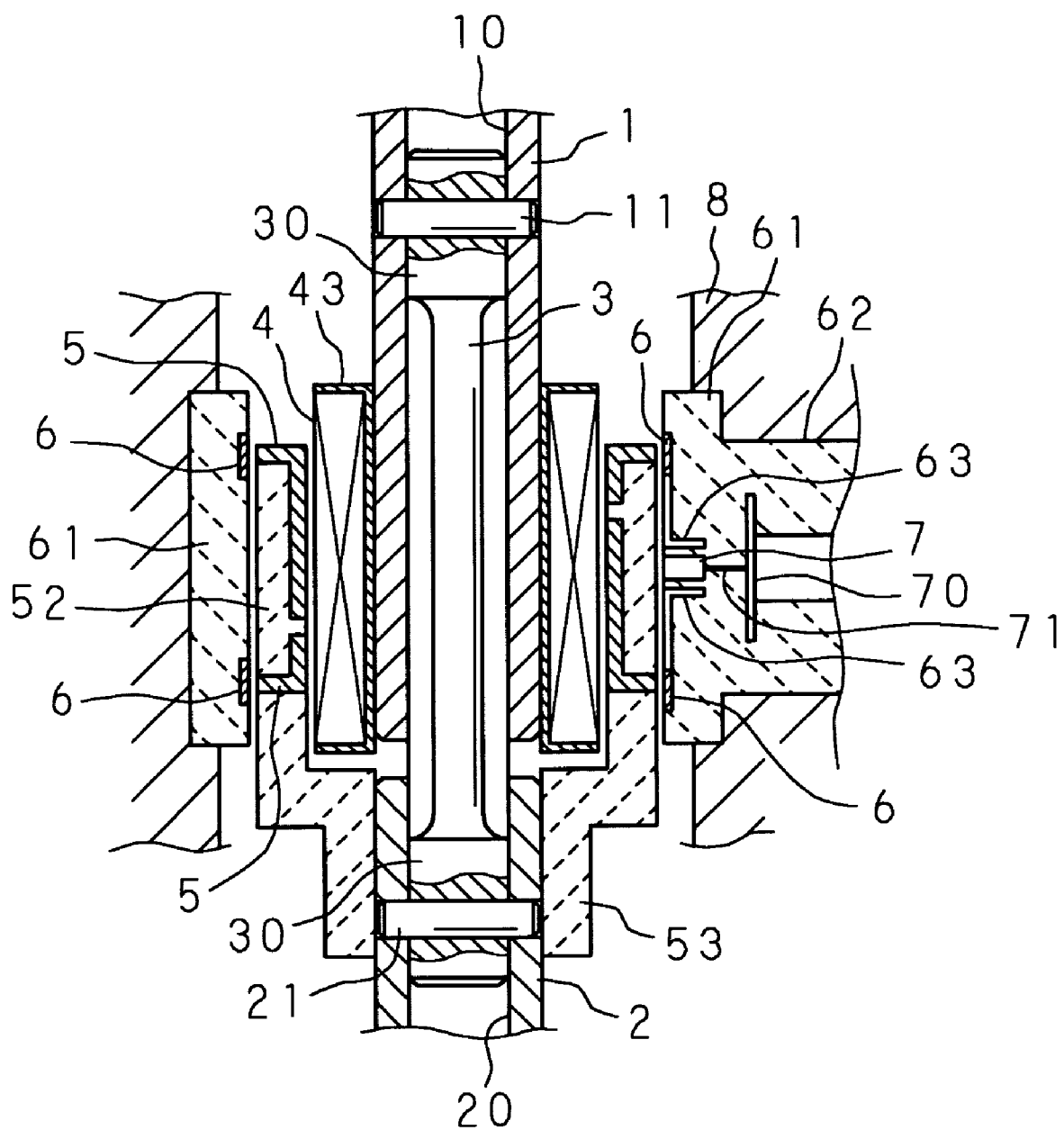
FIG. 11 is a longitudinally cross sectional view of the torque detecting apparatus shown in FIG. 10 at the assembled state.

FIG. 10 is an exploded perspective view of a torque detecting apparatus showing Embodiment 2 of the present invention. FIG. 11 is a longitudinally cross sectional view of the same at the assembled state. In the torque detecting apparatus, each magnetism collecting ring 6 has a magnetism collecting projection 63 of a specific width along the circumferential direction provided on the outer circumferential side thereof to extend outwardly. A pair of magnetic sensors 7 and 7 are disposed in an air gap between the magnetism collecting projections 63 and 63 for measuring the magnetic flux sneaking into between the two magnetism collecting projections 63 and 63. Since the other arrangement of this embodiment is identical to the torque detecting apparatus shown in FIGS. 1 and 2, like components are denoted by like numerals as those shown in FIGS. 1 and 2 and will be explained in no more detail.

Equally, this embodiment permits the two magnetic sensors 7 and 7 to be easily positioned in relation to the corresponding magnetism collecting projections 63 and 63 which are greater in the width with no use of any intricate positioning adjustment, hence significantly decreasing the number of assembling steps including the step of positional adjustment and calculating the torque exerted at higher accuracy. Moreover, since the outputs of the magnetic sensors 7 and 7 represent the magnetic flux between the opposite magnetism collecting projections 63 and 63 in this embodiment, any difference between the two outputs can be minimized and the action of examining the detection failure can be improved in the accuracy. The two magnetic sensors 7 and 7 are substantially equal in the effect of external disturbance such as magnetism or temperature and can thus be minimized in the declination of the detection accuracy by the effect of external disturbance.

Since the outputs of the two magnetic sensors 7 and 7 represent an average of the density of the magnetic flux between the opposite magnetism collecting projections 63 and 63 throughout their width, they may become lower in the level than those of the preceding arrangement shown in FIGS. 1 and 2, thus decreasing the accuracy of the torque detection. In this embodiment, the accuracy of the torque detection can be compensated or improved by bending both side edges of each magnetism collecting projection 63 as shown in FIG. 4.

Additionally for improving the level of the outputs of the magnetic sensors 7 and 7 and thus increasing the accuracy of the torque detection or measurement in the torque detecting apparatus of this embodiment, the air gap between the opposite magnetism collecting projections 60 and 60 (or 63 and 63) into which the magnetic sensors 7 and 7 are disposed can be minimized to as a small distance as possible.

Embodiment 3

Figure 12:
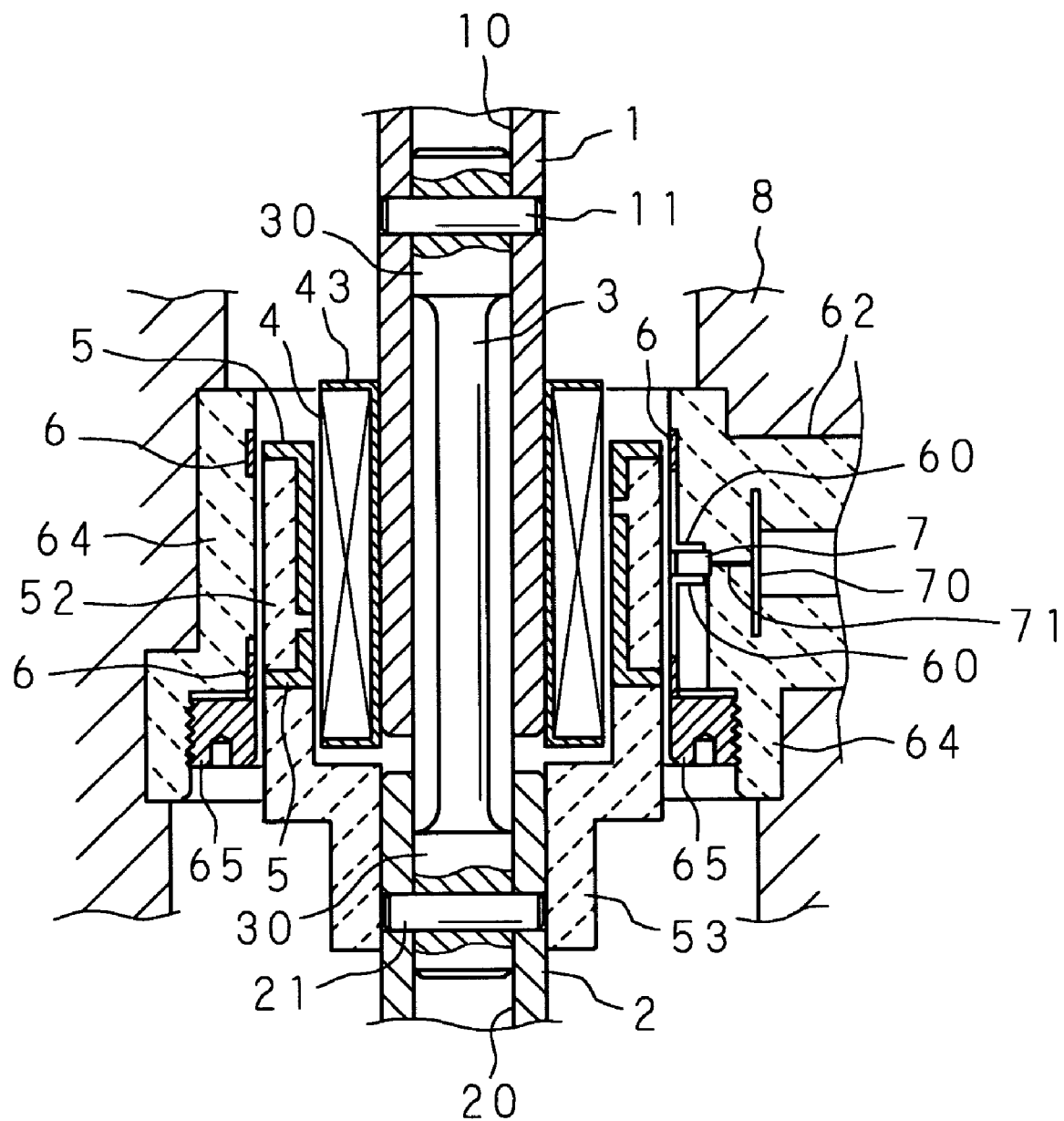
FIG. 12 is a longitudinally cross sectional view of a torque detecting apparatus showing Embodiment 3 of the present invention.

FIG. 12 is a longitudinally cross sectional view of a torque detecting apparatus showing Embodiment 3 of the present invention. The torque detecting apparatus has upper one in the drawing of two magnetism collecting rings 6 and 6 provided integrally on the inner side at one end of a cylindrical holder 64 made of a resin material and securely fitted via the cylindrical holder 64 into a housing 8. The other or lower magnetism collecting ring 6 is held in the inner side at the other end of the cylindrical holder 64 for movement along the axial direction and comes at the lowermost end into direct contact with an adjusting nut (adjusting means) 65 which is screwed in an opening provided in the side of the cylindrical holder 64. The other arrangement of this embodiment is identical to that of the torque detecting apparatus shown in FIG. 2 where like components are denoted by like numerals as those shown in FIG. 2 and their construction and action will be explained in no more detail.

In action, when the adjusting nut 65 is screwed in, its presses the lower magnetism collecting ring 6 which is in turn lifted up along the axial direction and comes closer to the upper magnetism collecting ring 6 in the cylindrical holder 64, whereby the air gap between the opposite magnetism collecting projections 60 and 60 provided on the circumference of the two magnetism collecting rings 6 and 6 respectively can be decreased.

The adjustment of the air gap is carried out for minimizing the air gap greater than the lower limit equal to the thickness of the magnetic sensor 7 when the magnetic sensor 7 has correctly been positioned between the opposite magnetism collecting projections 60 and 60, thus improving the accuracy of the torque detection and measurement. Also, the magnetic sensor 7 can easily be positioned in the air gap of generous size between the opposite magnetism collecting projections 60 and 60 before the adjustment, hence decreasing the number of steps for the assembling process.

Embodiment 4

Figure 13:
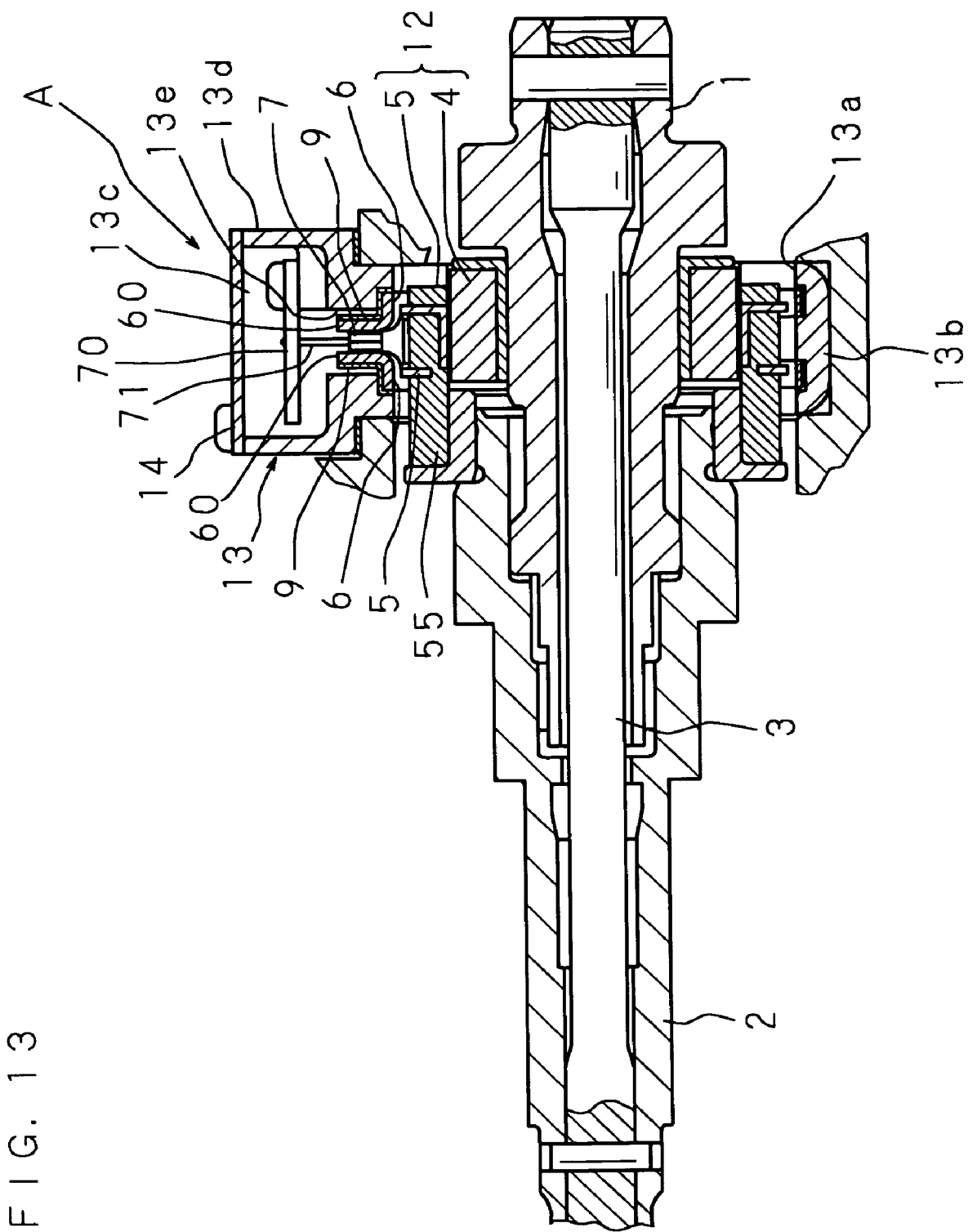
FIG. 13 is a cross sectional view of the torque detecting apparatus according to the embodiment.
Figure 14:
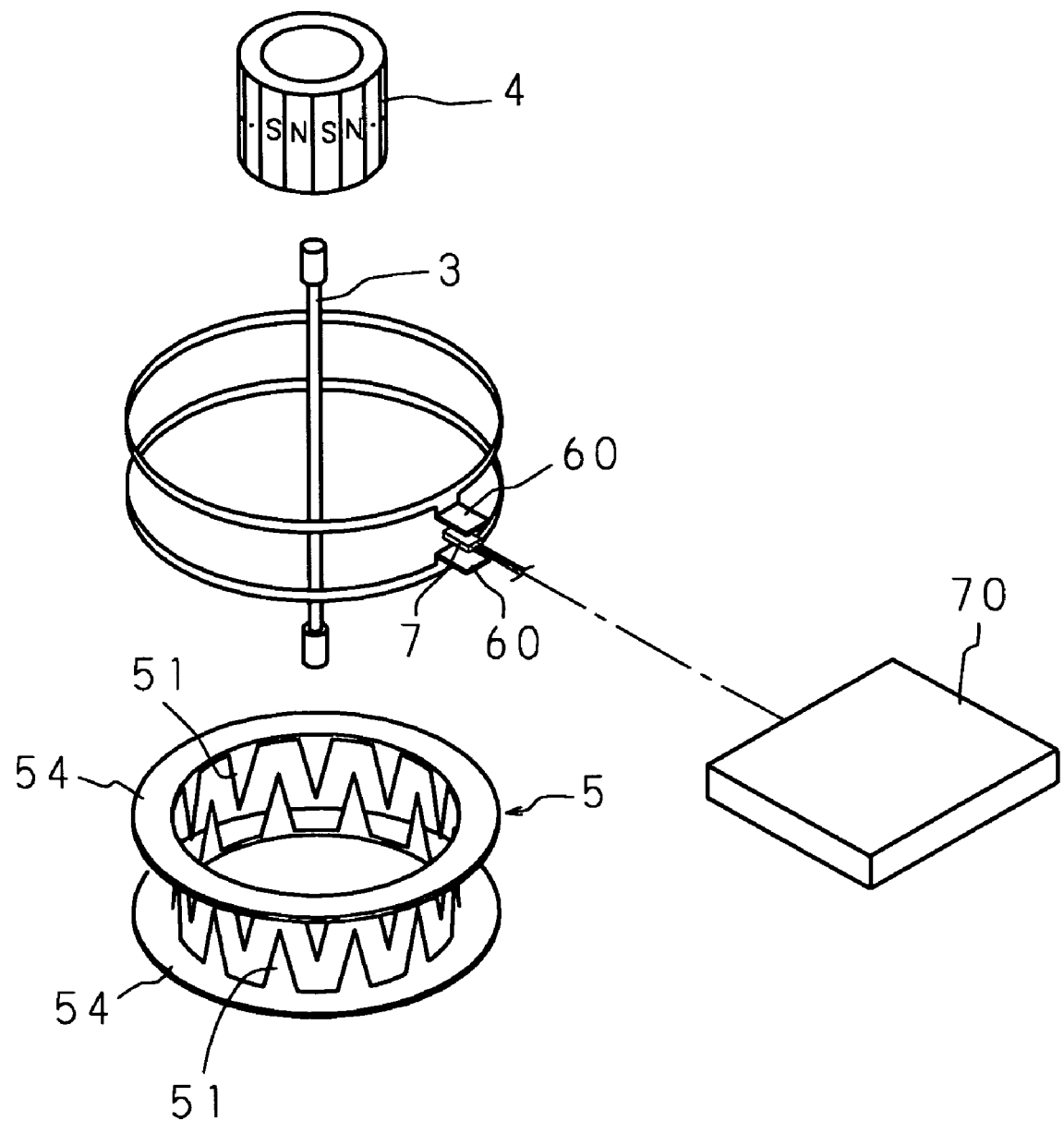
FIG. 14 is a schematically exploded perspective view of the torque detecting apparatus according to the present invention.
Figure 15:
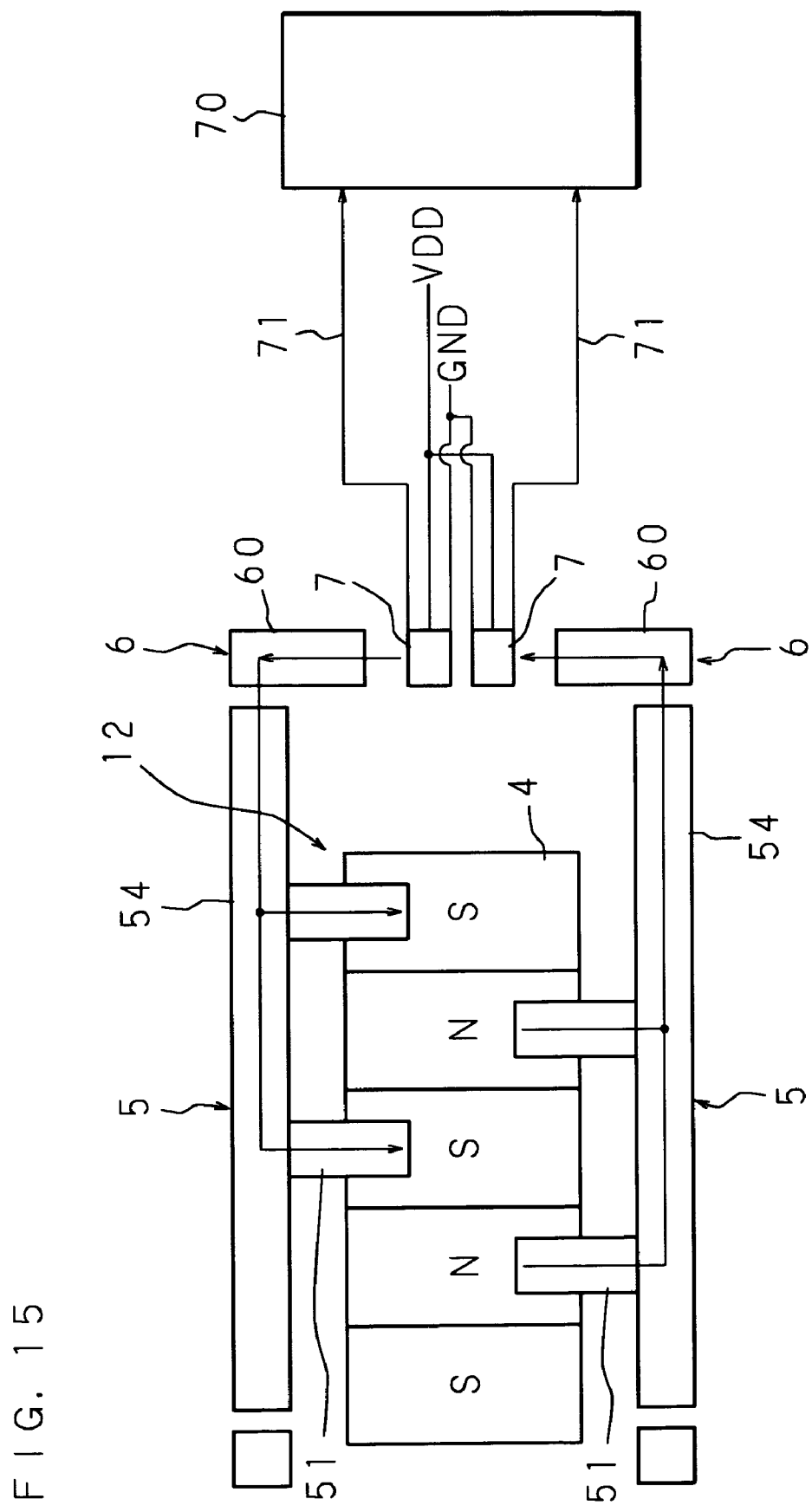
FIG. 15 is an explanatory view of a magnetic circuit induced by a rotating body turning in one direction.

FIG. 13 is a cross sectional view of a torque detecting apparatus showing Embodiment 4 of the present invention. FIG. 14 is a schematic exploded perspective view of the same and FIG. 15 is an explanatory view of a magnetic circuit generated when a rotating body is turned in one direction.

The torque detecting apparatus denoted by A comprises a pair of magnetism collecting rings 6 and 6 provided circumferentially of a magnetic circuit generating member 12, which is mounted on a first shaft 1 and a second shaft 2 joined coaxially to each other by a torsion bar 3, as separated from each other along the axial direction for collecting the magnetism generated by the magnetic circuit generating member 12, a pair of magnetic shielding layers 9 and 9 for magnetically shielding the magnetism collecting rings 6 and 6 respectively from the external magnetic field, a magnetic sensor 7 provided as a detector for detecting a torque exerted on the first shaft 1 from the density of a magnetic flux collected by the magnetism collecting rings 6 and 6, and a circuit board 70 connected by a lead 71 to the magnetic sensor 7. The magnetic circuit generating member 12 comprises a plurality of cylindrical magnets 4 bonded to the outer side of the first shaft 1 and a pair of yoke rings 5 and 5 fitted onto the second shaft 2 as arranged circumferentially of the cylindrical magnets 4. The rotating body is composed of the first shaft 1 and the second shaft 2.

The cylindrical magnets 4 are arranged in the form of a multi-pole ring where N poles and S poles are aligned alternately along the circumferential direction and securely fitted onto the first shaft 1.

The yoke rings 5 and 5 have two annular portions 54 and 54 thereof respectively arranged to face each other by a distance along the axial direction of the second shaft 2 and two sets of magnetic pole pawls 51 and 51 extended from the inner sides of the annular portions 54 and 54 towards each other so that the density of the magnetic flux between the yoke rings 5 and 5 is varied as they rotate in relation to the cylindrical magnets 4. As their magnetic pole pawls 51 and 51 are alternately arranged at equal intervals along the circumferential direction, the yoke rings 5 and 5 are joined together with the magnetic pole pawls 51 and 51 aligned alternately in a mold of a synthetic resin material, thus forming a mold body 55.

Figure 16:
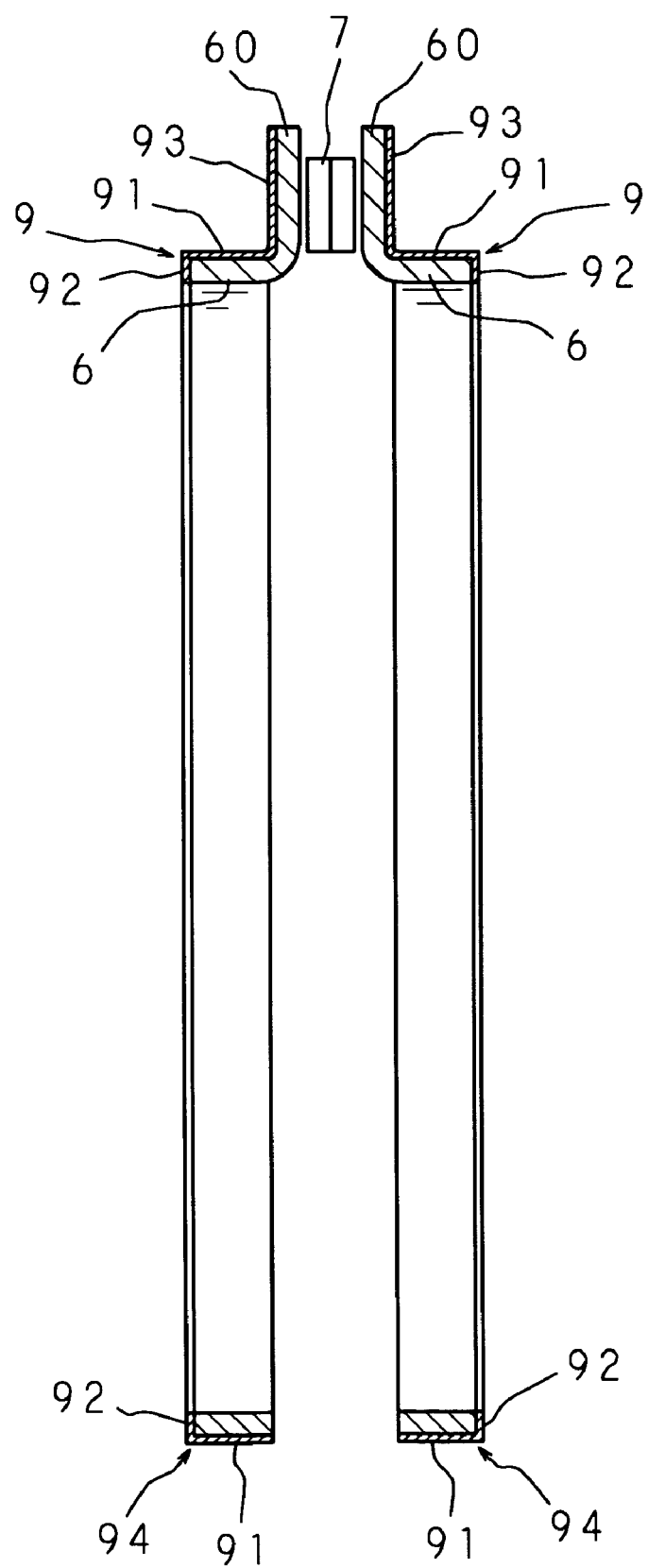
FIG. 16 is an enlarged cross sectional view of the magnetism collecting ring in the torque detecting apparatus according to the present invention.
Figure 17:
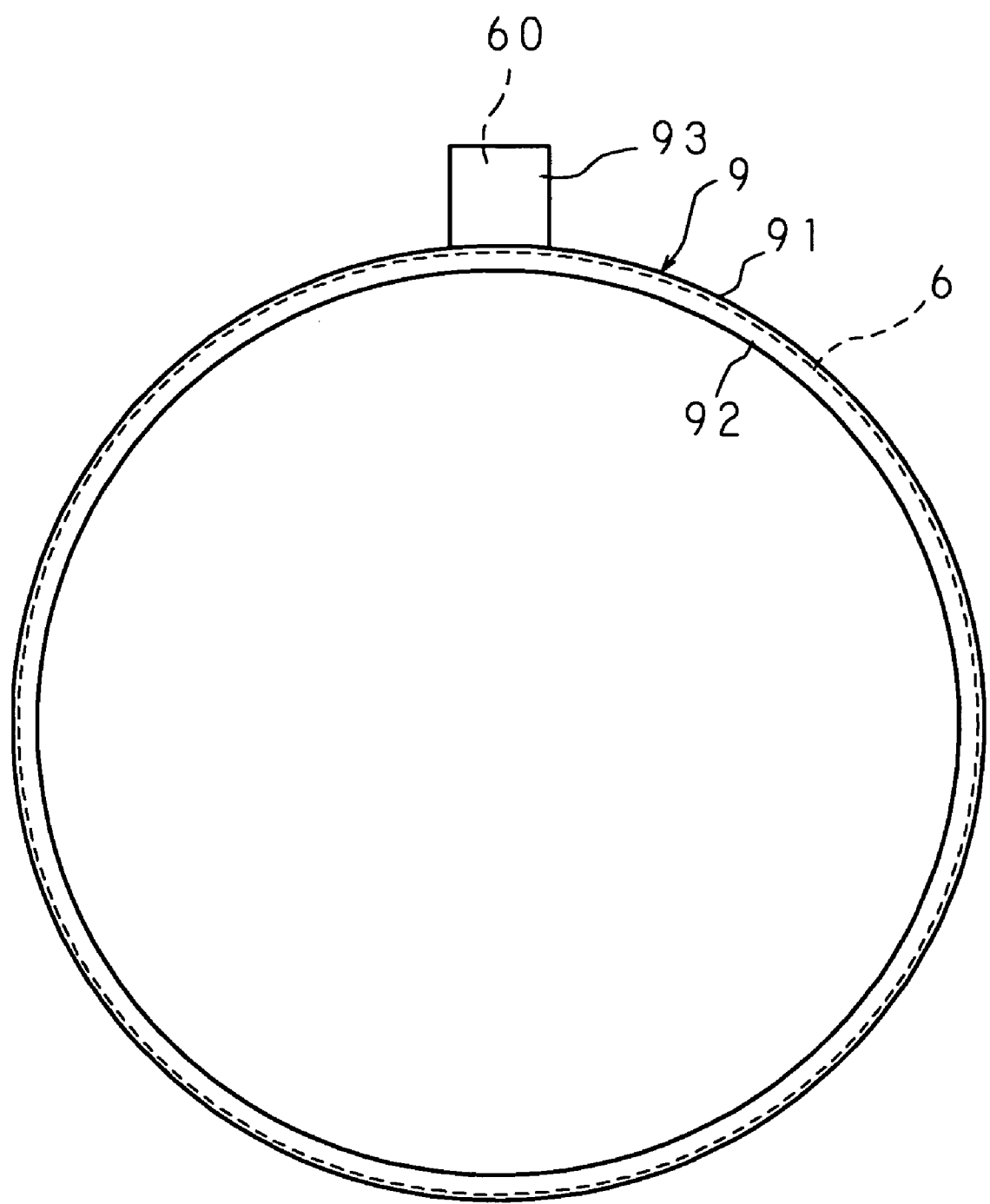
FIG. 17 is a side view of the magnetism collecting ring in the torque detecting apparatus according to the present invention.
Figure 18:
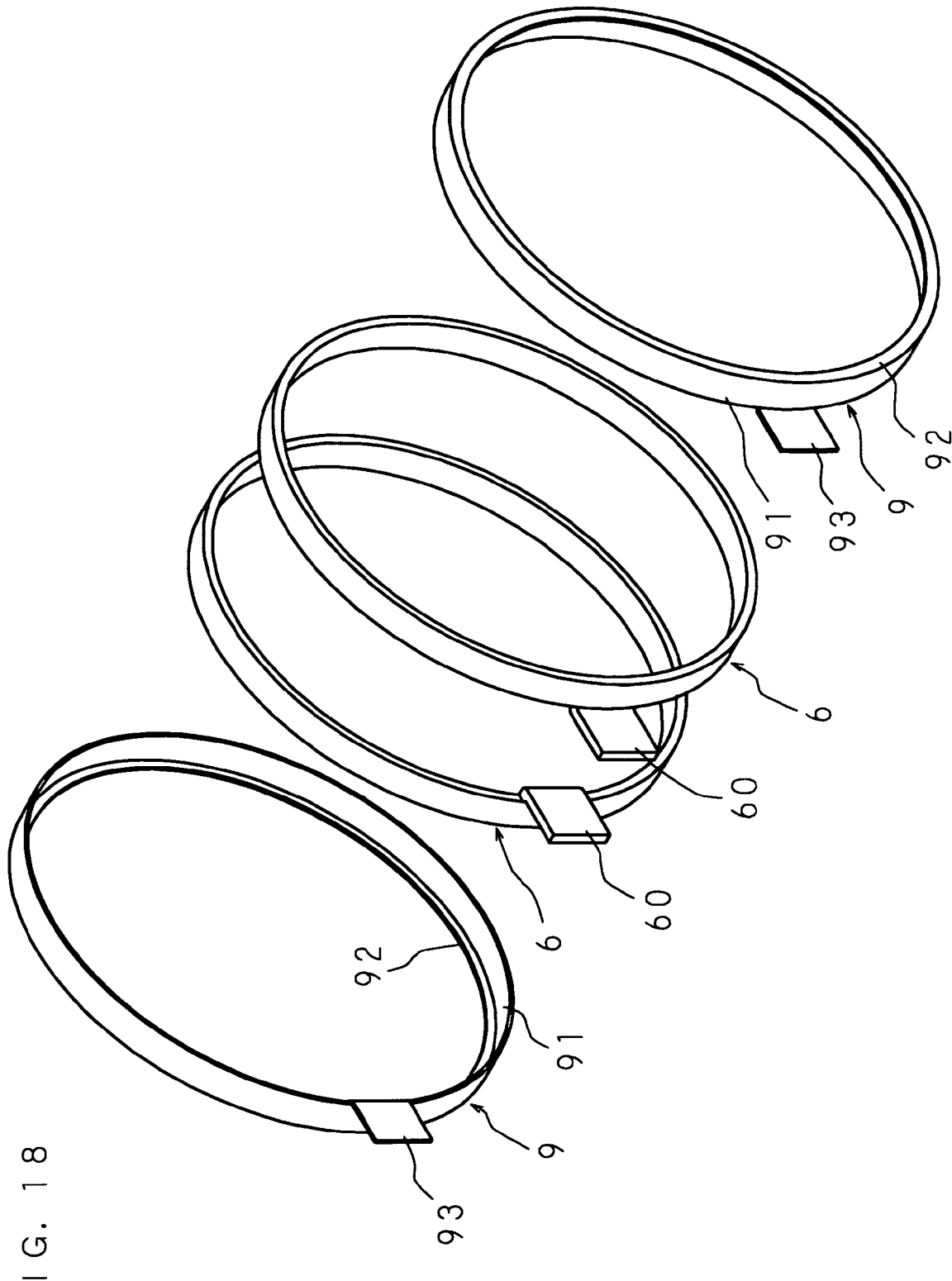
FIG. 18 is an exploded perspective view of the magnetism collecting rings in the torque detecting apparatus according to the present invention.

FIG. 16 is an enlarged cross sectional view of the magnetism collecting ring, FIG. 17 is a side view of the magnetism collecting ring, and FIG. 18 is an exploded perspective view of the magnetism collecting ring.

The magnetism collecting rings 6 and 6 at a cylindrical shape have magnetism collecting projections 60 and 60 thereof arranged to extend from particular locations along the circumference radially and outwardly and sandwich the magnetic sensor 7 from both ends, whereby the magnetic flux is concentrated between the two magnetism collecting projections 60 and 60. The magnetism collecting rings 6 and 6 are made of magnetic strips such as steel strips being shaped.

The magnetic shielding layers 9 and 9 have annular bodies 94 and 94 comprising tubular coating portions 91 and 91 coated over the outer side of the magnetism collecting rings 6 and 6, annular coating portions 92 and 92 coated over one end of the magnetism collecting rings 6 and 6, and sheet coating portions 93 coated over the outer side of the magnetism collecting projections 60 and 60. The annular bodies 94 and 94 are fitted onto the magnetism collecting rings 6 and 6 respectively. The magnetism collecting rings 6 and 6 having the annular bodies 94 and 94 fitted thereon are supported by a synthetic resin case 13 which serves as a supporting member. The magnetic shielding layers 9 and 9 are made of, but not limited to, a non-magnetic material such as silicon steel.

The case 13 comprises an annular portion 13*b* having a through hole 13*a* provided therein to face the inner side of the magnetism collecting rings 6 and 6 and a bottomed rectangular cylindrical portion 13*d* arranged to extend from the annular portion 13*b* radially and outwardly and define a containing space 13*c*. The containing space 13*c* is communicated by the through hole 13*e* in the annular portion 13*b*. As the magnetism collecting rings 6 and 6 are fitted into the annular portion 13*b*, their magnetism collecting projections 60 and 60 extend through the through hole 13*e*. A circuit board 70 is accommodated in the containing space 13*c* as secured by a small screw. The opening of the rectangular cylindrical portion 13*d* is closed with a cover 14 secured by small screws or the like.

The magnetic sensor 7 is a Hall device of which the electrical property (resistance) is varied by the effect of a magnetic field and its detection signal is determined by a change in the density of the magnetic flux induced between the magnetism collecting projections 60 and 60 before transferred to the circuit board 70. The magnetic sensor 7 is not limited to a Hall device but may be implemented by any magnetism sensitive device such as a magneto-resistance (MR) device which is varied in the electrical property (resistance) by the action of a magnetic field.

Since the torque detecting apparatus of this embodiment is protected with the magnetic shielding layers 9 and 9 composed mainly of the tubular coating portions 91 and 91 coated over the outer side of the magnetism collecting rings 6 and 6 for collecting the magnetic flux induced by the magnetic circuit generating member 12, the annular coating portions 92 and 92 coated over one end of the magnetism collecting rings 6 and 6, and the sheet coating portions 93 coated over particular regions (at the outer side along the axial direction where the detector is not present) of the magnetism collecting projections 60 and 60, it can decrease the effect of external magnetic fields on the magnetism collecting action of the magnetism collecting rings 6 and 6 and minimize any detector error resulting from the external magnetic fields. Also, as the magnetic shielding layers 9 and 9 cover not all but particular regions of the magnetism collecting rings 6 and 6, they can be declined in the manufacturing cost thus contributing to the overall cost down of the torque detecting apparatus.

FIG. 19 are explanatory views showing steps of fabricating the magnetic shielding layers in the torque detecting apparatus. The magnetic shielding layers 9 and 9 are made of a non-magnetic material such as silicon steel. The steps of fabrication may be classified into two methods shown in FIGS. 19(*a*) and 19(*b*). The method shown in FIG. 19(*a*) comprises the steps of (c) punching out an annular shape from the center of the non-magnetic material sheet of a four-sided shape, (d) shaping the annular strip 9*a*, and (e) forming the annular strip 9*a* into a cylindrical form.

The method shown in FIG. 19(*b*) comprises the steps of (f) punching out a pair of belt strips from both sides along the widthwise direction of the non-magnetic material sheet of a belt-like shape, (g) shaping the two belt strips 9*b* and 9*b*, and (h) bending the two belt strips 9*b* and 9*b* into annular shapes (with the tubular coating portions 91) so that each annular shape has one open gap provided at one region thereof and a projection (the sheet coating portion 93) projected from a region of the circumference thereof radially and outwardly. Since the method shown in FIG. 19(*b*) permits the two magnetic shielding layers 9 and 9 to be fabricated from the single belt-like non-magnetic sheet, it can thus be minimized in the unused area of the non-magnetic sheet, facilitated in the bending of the non-magnetic material, and decreased in the fabrication cost of the magnetic shielding layers 9 and 9 as compared with the method shown in FIG. 19(*a*) where an annular form is punched out from the four-sided shape of the non-magnetic sheet.

For fabricating the magnetic shielding layers 9 and 9 from a belt-like non-material sheet such as shown in FIG. 19(*b*), the belt strips 9*b* and 9*b* are not limited to simple flat rings but may be arranged of a corrugated form such as shown in FIG. 19(*i*).

The belt strips 9*b* and 9*b* of a corrugated form can be improved in the absorption of external magnetic fields. More specifically, as the magnetic flux is intrinsically concentrated at projected regions, the magnetic shielding effect will be enhanced.

Figure 20:
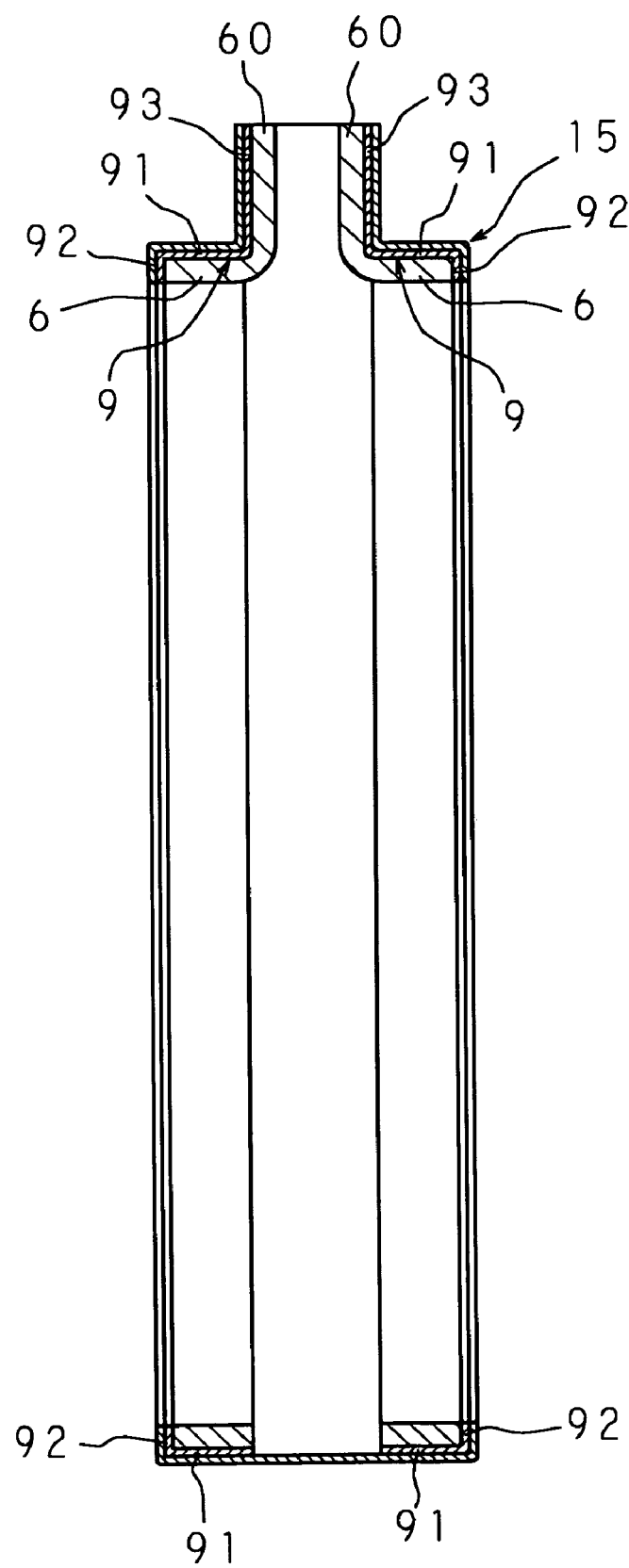
FIG. 20 is an enlarged cross sectional view of the magnetism collecting ring and its magnetic shielding layers protected with a mold of a synthetic resin material.

FIG. 20 is an enlarged cross sectional view of the magnetism collecting rings 6 and 6 with the magnetic shielding layers 9 and 9 molded with a synthetic resin material in the torque detecting apparatus. The magnetic shielding layer 9 and 9 shown in FIGS. 16 to 18 are fitted on and supported by the magnetism collecting rings 6 and 6. In the molding process, the magnetism collecting rings 6 and 6 with the magnetic shielding layers 9 and 9 are placed in the cavity in a set of molds and the cavity is filled up with the synthetic resin material which is equal to that for molding the case, thus packaging the magnetism collecting rings 6 and 6 with the magnetic shielding layers 9 and 9 in the mold. This allows the magnetism collecting rings 6 and 6 with the magnetic shielding layers 9 and 9 to be combined into a single unit, hence decreasing the number of the assembling steps, improving the efficiency of the assembling process, minimizing the operating miss during the assembling process, and lowering the production cost of the torque detecting apparatus.

Figure 21:
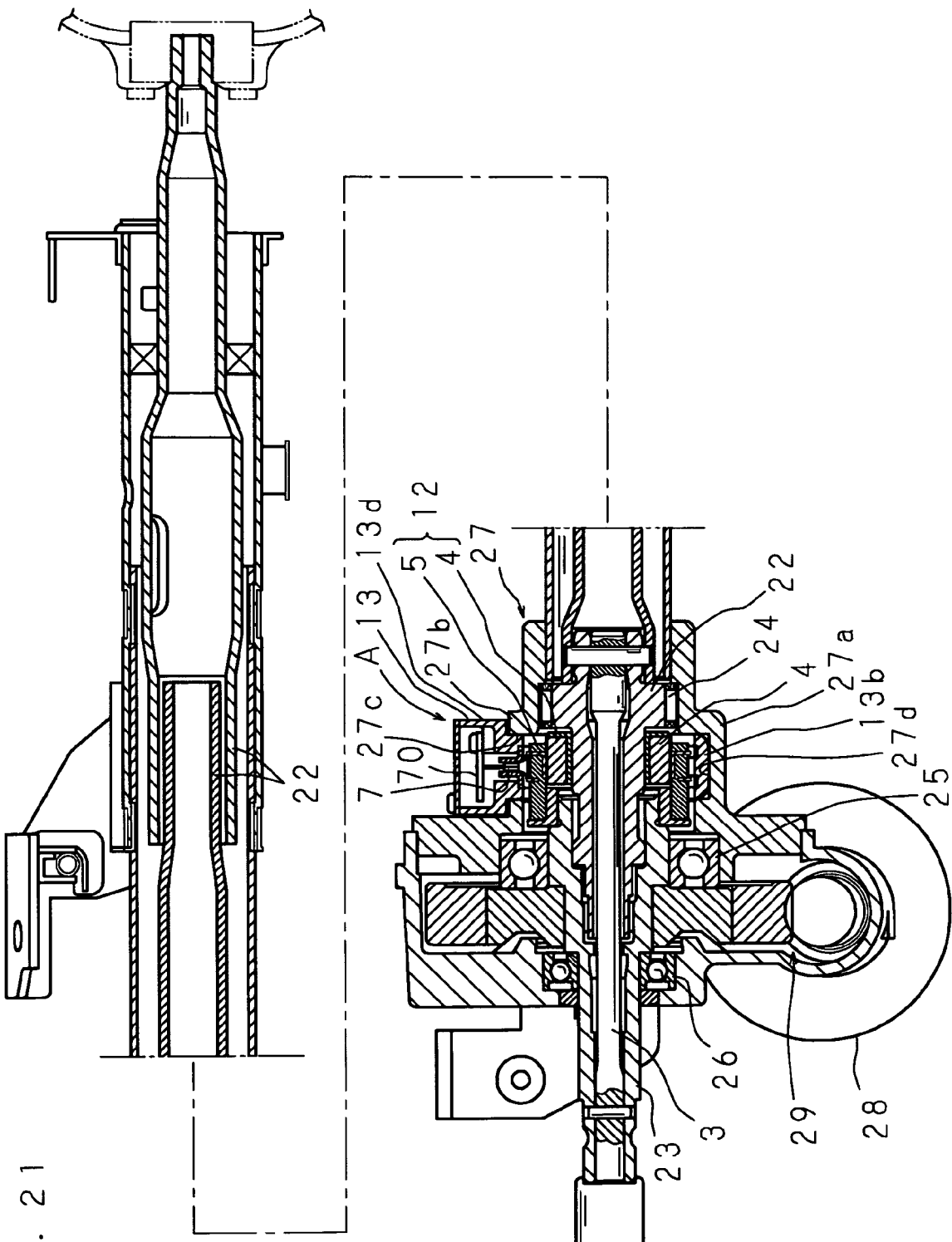
FIG. 21 is an enlarged cross sectional view of the torque detecting apparatus of the embodiment employed in an electric power steering system.

FIG. 21 is an enlarged cross sectional view of the torque detecting apparatus employed in an electric power steering system. The torque detecting apparatus denoted by A may be employed in the electric power steering system in a vehicle. The electric power steering system comprises an input shaft 22 (the first shaft 1) linked to a steering wheel, an output shaft 23 (the second shaft 2) joined coaxially by a torsion bar 3 to the input shaft 22, a housing 27 enclosing the input shaft 22 and the output shaft 23 and arranged for rotatably supporting the input shaft 22 and the output shaft 23 with three bearings 24, 25, and 26, an electric motor 28 mounted to the housing 27 for assisting the steering action, a speed reduction mechanism 29 for transmitting the rotating force of the driving shaft of the electric motor 28 to the output shaft 23, the torque detecting apparatus A, and a controller (not shown) which is commonly implemented by a microprocessor connected to a driver circuit for the electric motor 28 and the circuit board 70 of the torque detecting apparatus A. When the steering wheel is operated, its steering torque is exerted on the input shaft 22 thus creating a twist of the torsion bar 3 which is then measured by the magnetic sensor 7 and converted into an electric signal by the circuit board 70 before transferred to the controller. In turn, the controller delivers a command signal to the electric motor 28 which drives via the speed reduction mechanism 29 the output shaft 3 to rotate.

The housing 27 comprises a cylindrical portion 27*a* for enclosing the input shaft 22 and the output shaft 23, a mount base 27*b* provided to extend from the outer side of the cylindrical portion 27a for securely holding the case 13, a through hole 27c provided radially in the mount base 27b for installing the magnetism collecting rings 6 and 6 in the cylindrical portion 27a, and a fitting recess 27d communicated with the through hole 27c and arranged arcuate to match the annular portion 13b of the case 13. The case 13 is mounted on the mount base 27b.

When the case 13 is inserted with its annular portion 13b across the through hole 27c, which radially extends, into the cylindrical portion 27a of the housing 27, its annular portion 13b is engaged with the fitting recess 27d and its rectangular cylindrical portion 13d is joined to the mount base 27b so that the magnetism collecting rings 6 and 6 are set at their position in the cylindrical portion 27a. After the case 13 is mounted, the input shaft 22 and the output shaft 23 are inserted from the axial direction into the cylindrical portion 27a of the housing 27 and the cylindrical magnets 4 and the yoke rings 5 are installed at the inner side of the magnetism collecting rings 6 and 6.

Although the magnetic shielding layers 9 and 9 are made of a non-magnetic material such as silicon steel in this embodiment, they may be implemented by coatings of a non-magnetic material on the magnetism collecting rings 6 and 6 or favorable strips of a non-magnetic material bonded on the magnetism collecting rings 6 and 6.

INDUSTRIAL APPLICABILITY

The torque detecting apparatuses according to the present invention may successfully be utilized in not only an electric power steering system but also any other similar system.

What is claimed is:

1. A torque detecting apparatus comprising:
   a first shaft and a second shaft joined coaxially to each other;
   a cylindrical magnet arranged for rotating together with the first shaft;
   a pair of yoke rings arranged for rotating together with the second shaft in a magnetic field induced by the cylindrical magnet;
   a pair of magnetism collecting rings arranged to surround the two yoke rings respectively from the outer side; and
   a magnetic sensor disposed between two opposite magnetism collecting projections provided outwardly on the outer side of the magnetism collecting rings respectively,
   wherein a torque exerted on the first and second shafts is detected from the density of the magnetic flux induced between the two opposite magnetism collecting projections and measured by the magnetic sensor,
   the magnetism collecting projections are arranged at two or more locations on the circumference of each of the pair of magnetism collecting rings, the magnetism collecting projections being directed substantially in parallel with each other, and
   the magnetic sensors are disposed between the corresponding pairs of the magnetism collecting projections.

2. A torque detecting apparatus according to claim 1, wherein the magnetism collecting projections are provided in two or more pairs.

3. A torque detecting apparatus according to claim 1, wherein the magnetism collecting projections arc arranged of a rectangular shape of which the length T1 along the direction of projection and the width T2 along a direction orthogonal to the direction of projection are predetermined so that the following statements are satisfied where E1 and E2 are the length and the width respectively of the detecting area of the magnetic sensor, $$0.1 (mm) < (T1-E1) < 10 \text{ (mm) and}$$

$$0.1 (mm) < (T2-E2) < 10 \text{ (mm).}$$

4. A torque detecting apparatus according to claim 1, wherein one of the two opposite magnetism collecting projections is arranged to be bent at both side edges in a direction of departing from the other magnetism collecting projection.

5. A torque detecting apparatus according to claim 1, further comprising:
   an adjusting nut for moving one of the two magnetism collecting rings to and from the other in order to modify the distance between any two opposite magnetism collecting projections.

6. A torque detecting apparatus according to claim 1, wherein three or more of the magnetic sensors are provided, and the density of the magnetic flux between the two opposite magnetic collecting projection to be detected by the magnetic sensor is determined from the principle of majority rule.

7. A torque detecting apparatus comprising:
   a first shaft and a second shaft joined coaxially to each other;
   a cylindrical magnet arranged for rotating together with the first shaft;
   a pair of yoke rings arranged for rotating together with the second shaft in a magnetic field induced by the cylindrical magnet;
   a pair of magnetism collecting rings arranged to surround the two yoke rings respectively from the outer side; and
   a magnetic sensor disposed between two opposite magnetism collecting projections provided outwardly on the outer side of the magnetism collecting rings respectively,
   wherein a torque exerted on the first and second shafts is detected from the density of the magnetic flux induced between the two opposite magnetism collecting projections and measured by the magnetic sensor,
   the distance between the two opposite magnetism collecting projections is sized for accepting the magnetic sensor therein, and
   the magnetism collecting projections are arranged at two or more locations on the circumference of each of the pair of magnetism collecting rings, the magnetism collecting projections being directed substantially in parallel with each other.

8. A torque detecting apparatus according to claim 7, wherein one of the two opposite magnetism collecting projections is arranged to be bent at both side edges in a direction of departing from the other magnetism collecting projection.

9. A torque detecting apparatus according to claim 7, further comprising:
   an adjusting. nut for moving one of the two magnetism collecting rings to and from the other in order to modify the distance between any two opposite magnetism collecting projections.

10. A torque detecting apparatus according to claim 7, wherein three or more of the magnetic sensors are provided, and the density of the magnetic flux between the two opposite magnetic collecting projection to be detected by the magnetic sensor is determined from the principle of majority rule.

11. A torque detecting apparatus comprising:
    a rotating body;
    a magnetic circuit generating member mounted on the rotating body;

magnetism collecting rings provided about the magnetic circuit generating member for collecting the magnetic flux induced by the magnetic circuit generating member; and a detector for detecting from the magnetic flux collected by the magnetism collecting rings a torque exerted on the rotating body, wherein the magnetism collecting rings have magnetic shielding layers provided on the outer side thereof and the magnetic shielding layers are made of a non-magnetic material.

12. A torque detecting apparatus according to claim 11, wherein the magnetic shielding layers are fitted onto the magnetism collecting rings and arranged of an annular shape which has an open gap provided in the circumference thereof and projections provided extending radially and outwardly from an intermediate location of the circumference thereof.

13. A torque detecting apparatus according to claim 11, wherein the magnetism collecting rings and their magnetic shielding layers are made by molding a synthetic resin material.

14. A torque detecting apparatus according to claim 12, wherein the magnetism collecting rings and their magnetic shielding layers are made by molding a synthetic resin material.

15. A torque detecting apparatus comprising:

a rotating body;

a magnetic circuit generating member mounted on the rotating body;

a pair of magnetism collecting rings provided about the magnetic circuit generating member as spaced from each other along the axial direction for collecting the magnetic flux induced by the magnetic circuit generating member; and a detector for detecting from the magnetic flux collected by the magnetism collecting rings a torque exerted on the rotating body, wherein the magnetism collecting rings are arranged of a cylindrical shape having a projection extended from one location of the circumference thereof radially and outwardly and magnetic shielding layers for magnetically shielding the circumference, the end sides, and a region of the projection thereof and the magnetic shielding layers are made of a non-magnetic material.

16. A torque detecting apparatus according to claim 15, wherein the magnetism collecting rings and their magnetic shielding layers are made by molding a synthetic resin material.

* * * * *